United States Patent
Yu

(10) Patent No.: US 9,819,718 B2
(45) Date of Patent: Nov. 14, 2017

(54) METHOD FOR MANAGING APPARATUS AND INFORMATION DISTRIBUTING APPARATUS

(71) Applicant: LENOVO (BEIJING) CO., LTD., Beijing (CN)

(72) Inventor: Chentao Yu, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 360 days.

(21) Appl. No.: 14/023,189

(22) Filed: Sep. 10, 2013

(65) Prior Publication Data

US 2014/0074978 A1    Mar. 13, 2014

(30) Foreign Application Priority Data

Sep. 10, 2012 (CN) .......................... 2012 1 0333608
Sep. 17, 2012 (CN) .......................... 2012 1 0345729

(51) Int. Cl.
*G06F 15/16*    (2006.01)
*H04L 29/08*    (2006.01)

(52) U.S. Cl.
CPC .................................. *H04L 67/02* (2013.01)

(58) Field of Classification Search
CPC ........................... H04L 67/02; H04L 41/0896
USPC ........................................................ 709/217
See application file for complete search history.

(56) References Cited

U.S. PATENT DOCUMENTS

| | | | | |
|---|---|---|---|---|
| 2007/0094367 A1* | 4/2007 | Esfahany | ............. | G06F 9/5077 709/223 |
| 2009/0138551 A1* | 5/2009 | Hubbard | ............. | G06Q 10/0631 709/203 |
| 2010/0146132 A1* | 6/2010 | Morris | ............. | H04L 29/12066 709/229 |
| 2013/0262443 A1* | 10/2013 | Leida | ................ | G06F 17/30427 707/722 |

FOREIGN PATENT DOCUMENTS

CN    101441580 A    5/2009

OTHER PUBLICATIONS

Chinese Patent Application 201210333608.7, Chinese Patent Office, Second Office Action mailed Nov. 22, 2016; 7 pages.

(Continued)

*Primary Examiner* — Melvin H Pollack
(74) *Attorney, Agent, or Firm* — Dentons US LLP; Peter Su

(57) ABSTRACT

The embodiments of the present disclosure provide a method for managing an apparatus and an information distributing apparatus. The method for managing an apparatus according to the embodiment of the present disclosure is applied in the information distributing apparatus, and the method includes obtaining a first apparatus identification of the information distributing apparatus; obtaining a local capacity resource parameter of at least one item of apparatus capacity resource of the information distributing apparatus; generating the capacity resource distribution information of this item of the apparatus capacity resource, according to the first apparatus identification and the local capacity resource parameter of each item of the apparatus capacity resource; sending the capacity resource distribution information of the apparatus capacity resource to the first server through the wide area network.

20 Claims, 11 Drawing Sheets

(56) References Cited

OTHER PUBLICATIONS

English Text of Second Office Action for Chinese Patent Application 201210333608.7, Chinese Patent Office, Second Office Action dated Nov. 22, 2016; 7 pages.
Chinese Patent Application 201210333608.7, Chinese Patent Office, First Office Action dated Apr. 11, 2016; 9 pages.
English Text of First Office Action for Chinese Patent Application 201210333608.7, Chinese Patent Office, First Office Action dated Apr. 11, 2016; 7 pages.
Chinese Patent Application 201210345729.3, Chinese Patent Office, First Office Action dated Apr. 19, 2016; 6 pages.
English Text of First Office Action for Chinese Patent Application 201210345729.3, Chinese Patent Office, First Office Action dated Apr. 19, 2016; 3 pages.
English Text Translation of Chinese Patent Application 101441580 (A), Published on May 27, 2009; 13 pages.

* cited by examiner

METHOD FOR MANAGING APPARATUS AND INFORMATION DISTRIBUTING APPARATUS

CROSS REFERENCE TO RELATED APPLICATIONS

This application claims the benefit under 35 U.S.C. §119(a) of Chinese Patent Application No. CN 201210333608.7, filed on Sep. 10, 2012, and Chinese Patent Application No. CN 201210345729.3, filed on Sep. 17, 2012, the entire disclosures of which are incorporated by reference herein in their entireties.

TECHNICAL FIELD

The present disclosure relates to a method for managing an apparatus and a corresponding information distributing apparatus.

BACKGROUND

In recent years, more terminal apparatuses of high capability, such as personal computer, portable computer, tablet computer, smart phone, portable music player, and smart TV, come into wide use, and one individual user may have a plurality of such terminal apparatuses of high capability at the same time. However, when the user uses the plurality of such terminal apparatuses of high capability at the same time, due to the limitation of the conventional apparatus ecosystem, apparatus appearance and cost or the like, the user may find that the data migration and cooperation between the pluralities of apparatuses is very difficult.

For example, the conventional connection between the mobile phone and the personal computer is usually limited to data transmission, it is difficult for the user to manage and use various kinds of peripheral equipment, connected to his/her own personal computer through the mobile phone. Similarly, the PC is difficult to use and control apparatus resource on the mobile phone. Though some of software for apparatus cooperation is suggested for solving more or less the above problem, these solutions usually require the user to install the related application and require the user to know an intercommunication protocol between many apparatuses, and the usage mode of different applications software or the like, which bring inconvenience to the operation of the user.

SUMMARY

Embodiments of the present disclosure provide a method for managing an apparatus and a corresponding information distributing apparatus to solve the above problem.

One embodiment of the present disclosure provides a method for managing an apparatus applied in an information distributing apparatus. The method includes obtaining a first apparatus identification of the information distributing apparatus. The first apparatus identification including a user identification, the identification of a first autonomy environment to which the information distributing apparatus belongs, and a second apparatus identification of the distributing apparatus in the first autonomy environment to which it belongs; obtaining a local ability resource parameter of at least one item of apparatus capacity resource of the information distributing apparatus, the apparatus capacity resource being provided by an internal device that the information distributing apparatus has and/or a peripheral device connected to the information distributing apparatus in the first autonomy environment, and the local ability resource parameter including a description parameter of the item of apparatus capacity resource and a device identification of the internal device and/or peripheral device providing the item of apparatus capacity resource in the first autonomy environment; generating capacity resource distribution information of the item of apparatus capacity resource according to the first apparatus identification and the local capacity resource parameter of each item of apparatus capacity resource; sending the capacity resource distribution information of the apparatus capacity resource to a first server through wide area network.

Another embodiment of the present disclosure provides a method for managing an apparatus applied in an information distributing apparatus, and the method includes obtaining a first apparatus identification of the information distributing apparatus. The first apparatus identification including a user identification, an identification of a first autonomy environment to which the information distributing apparatus belongs and a second apparatus identification of the distributing apparatus in the first autonomy environment to which it belongs; obtaining a local storage resource parameter of at least one item of storage resource of the information distributing apparatus, the local storage resource parameter including a description parameter of the item of storage resource and a storage identification indicating the storage location of the storage resource with respect to the information distributing apparatus, and the storage resource including local data stored in the information distributing apparatus, data entry information stored in a relation database of the information distributing apparatus, data stream generated in the information distributing apparatus, and/or remote end data stored in a second server capable of being connected with the information distributing apparatus; generating storage resource distribution information of the item of storage resource according to the first apparatus identification and the local-storage resource parameter of each item of storage resource; sending the storage resource distribution information to a first server through wide area network.

Yet another embodiment of the present disclosure provides an information distributing apparatus including an identification managing unit configured to obtain a first apparatus identification of the information distributing apparatus. The first apparatus identification including a user identification, the identification of a first autonomy environment to which the information distributing apparatus belongs, and a second apparatus identification of the distributing apparatus in the first autonomy environment to which it belongs; a capacity resource managing unit configured to obtain a local capacity resource parameter of at least one item of apparatus capacity resource of the information distributing apparatus, the apparatus capacity resource being provided by an internal device that the information distributing apparatus has and/or a peripheral device connected to the information distributing apparatus in the first autonomy environment, and the local ability resource parameter including a description parameter of the item of apparatus capacity resource and a device identification of the internal device and/or peripheral device providing the item of apparatus capacity resource in the first autonomy environment; an information generating unit configured to generate capacity resource distribution information of the item of apparatus capacity resource according to the first apparatus identification and the local capacity resource parameter of each item of apparatus capacity resource; a resource distributing unit configured to send the capacity resource distribution information of the apparatus capacity resource to a first server through wide area network.

Yet another embodiment of the present disclosure provides an information distributing apparatus including an identification managing unit configured to obtain a first apparatus identification of the information distributing apparatus. The first apparatus identification including a user identification, an identification of a first autonomy environment to which the information distributing apparatus belongs and a second apparatus identification of the distributing apparatus in the first autonomy environment to which it belongs; a storage resource managing unit configured to obtain a local storage resource parameter of at least one item of storage resource of the information distributing apparatus, the local storage resource parameter including a description parameter of the item of storage resource and a storage identification indicating the storage location of the storage resource with respect to the information distributing apparatus, and the storage resource including local data stored in the information distributing apparatus, data entry information stored in a relation database of the information distributing apparatus, data stream generated in the information distributing apparatus, and/or remote end data stored in a second server capable of being connected with the information distributing apparatus; an information generating unit configured to generate storage resource distribution information of the item of storage resource according to the first apparatus identification and the local-storage resource parameter of each item of storage resource; and a resource distributing unit configured to send the storage resource distribution information to a first server through wide area network.

With the above-described solution provided by the embodiments of the present disclosure, the user does not need to install a special application for interconnecting with other apparatus in the terminal apparatus and does not need to know the intercommunication protocol between a lot of apparatuses and the usage mode of different applications software or the like. By sending capacity resource distribution information and/or storage resource distribution information to the server, the user can know and control the shared apparatus capacity resource and/or storage resource that the respective terminal apparatuses thereof have easily, and then implement sharing of the apparatus capacity resource and/or storage resource between the respective apparatuses.

BRIEF DESCRIPTION OF THE DRAWINGS

In order to describe the technical solution of the embodiments of the disclosure more clearly, the accompanying drawings necessary for the description of the embodiments are explained simply. The accompanying drawings in the following description are only exemplary embodiments of the disclosure.

DETAILED DESCRIPTION

Hereinafter, the preferred embodiments of the disclosure are described in detail with reference to the accompanying drawings. It is noted that in the specification and accompanying drawings, substantially same steps and elements are represented by the same reference numbers, and the repetitive explanation on these steps and elements would be omitted.

In the embodiments of the present disclosure below, autonomy environment means a local area network environment constituted by at least one terminal apparatus interconnected and the peripheral apparatus connected to the corresponding terminal apparatus. As described below, in the autonomy environment, there is at least one information distributing apparatus to manage and distribute capacity resource distribution information of apparatus capacity resource that the terminal apparatus has to the wide area network. According to one example of the present disclosure, each terminal apparatus can be used as the information distributing apparatus. Alternatively, in an autonomy environment, a specific terminal apparatus can be set as the information distributing apparatus in advance, other terminal apparatus sends the capacity resource distribution information of the apparatus capacity resource thereof to the information distributing apparatus, and sends to the server through the information distributing apparatus. Optionally, according to another example of the present disclosure, the respective terminal apparatus and peripheral apparatus connected to the corresponding terminal apparatus in the autonomy environment can be interconnected based on the Intelligent Grouping and Resource Sharing (IGRS) protocol. In addition, according to another example of the present disclosure, the autonomy environment may be wired or wireless local area networks environment.

In the embodiments of the present disclosure below, the specific form of the information distributing apparatus and the terminal apparatus include, but not limited to smart phone, personal computer, personal digital assistant, portable computer, tablet computer, portable multimedia player, smart TV, and so on. According to one example of the present disclosure, the information distributing apparatus can be connected to the wide area network directly, and carries out data transmission with the server through the wide area network. In this case, the information distributing apparatus has wide area network address that can be recognized in the wide area network. Alternatively, according to another example of the present disclosure, the information distributing apparatus cannot be connected to the wide area network directly. In this case, the information distributing apparatus can carry out-data transmission with the server in the wide area network via agency apparatus connected to the wide area network in the first autonomy environment, wherein, the agency apparatus has the wide area network address that can be used in the wide area network.

Figure 1:
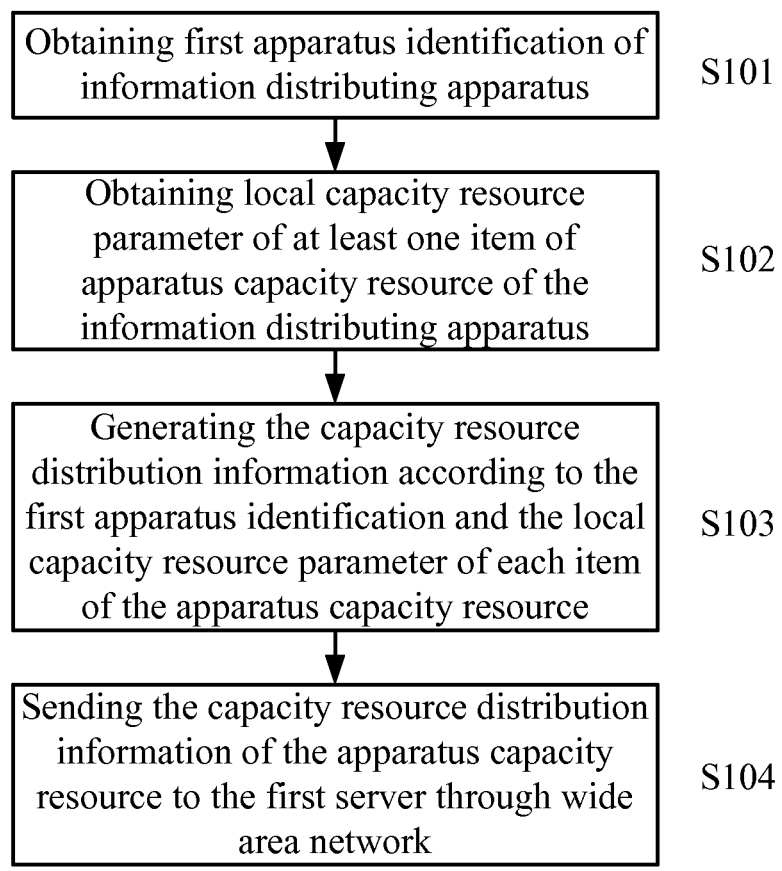
FIG. 1 is a flow chart illustrating the method for managing an apparatus according to a first embodiment of the present disclosure.

FIG. 1 is a flow chart illustrating the method 100 for managing an apparatus according to the first embodiment of the present disclosure. The method 100 for managing the apparatus can be applied in the above-described information distributing apparatus. As shown in FIG. 1, in step S101, a first apparatus identification of the information distributing apparatus is obtained, wherein, the first apparatus identification includes a user identification, an identification of a first autonomy environment to which the information distributing apparatus belongs, and a second apparatus identification of the distributing apparatus in the first autonomy environment to which it belongs. According to one example of the present disclosure, the user identification may be a user name, and more particularly, the user identification may be the user name used when the user registers in the server in the wide area network.

In step S102, a local capacity resource parameter of at least one item of apparatus capacity resource of the information distributing apparatus is obtained. The apparatus capacity resource is capacity provided by the internal device that the information distributing apparatus has and/or a peripheral device connected to the information distributing apparatus, for example, printing, taking photo, recording, video/audio playing, GPS information acquiring, keyboard control, network access, and so on.

According to one example of the present disclosure, the internal device that the information distributing apparatus has may be the device included in the information distributing apparatus itself, for example, the display device, modem, GPS device of the information distributing apparatus or the like. In addition, according to another example of the present disclosure, the peripheral device can be connected to the information distributing apparatus through cable directly, and alternatively, the peripheral device can be interconnected with the information distributing apparatus via LAN. Optionally, the peripheral device may be interconnected with the information distributing apparatus based on protocols such as universal plug and play protocol (UPnP) leaded by Microsoft Corporation, short distance interconnection protocol (Alljoyn) of Qualcomm corporation, short distance interconnection protocol (Bonjour and Airplay) of Apple corporation and Simple Network Management based Protocol (SNMP), and intelligent grouping and resource sharing protocol (IGRS) of Lenovo corporation. For example, the peripheral devices may be smart TV, router, printer, digital camera or the like based on the above-described protocols.

According to one example of the present disclosure, the apparatus capacity resource includes all of the functions that can be provided by the internal device of the distributing apparatus and/or the peripheral device. Further, the apparatus capacity resource includes part of the functions that can be provided by the internal device of the distributing apparatus and/or the peripheral device. For example, the internal device of the distributing apparatus may provide storage function, and the internal device has five storage modules. The user may set all of the five storage modules as the apparatus capacity resource that can be distributed through the apparatus capacity resource as necessary, and alternatively, the user may set only three storage modules out of all of the five storage modules as the apparatus capacity resource that can be distributed through the apparatus capacity resource Back to step S102, the local capacity resource parameter of each item of the apparatus capacity resource includes description parameters of the item of the apparatus capacity resource and device identifications in the first autonomy environment of the internal device and/or the peripheral device providing the item of the apparatus capacity resource. According to one example of the present disclosure, the description parameters of the apparatus capacity resource may include one or more of the operation mode, resource type, resource name, distribution expiry date of the resource, description of the access method of the resource, the attribute description of the resource, and device name of this item of the apparatus capacity resource.

Then, in step S103, the capacity resource distribution information of this item of the apparatus capacity resource is generated according to the first apparatus identification, and the local capacity resource parameter of each item of the apparatus capacity resource. According to one example of the present disclosure, the capacity resource distribution information may include a first universal resource identifier (URI), wherein, the first URI indicates the operation address of the device providing this item of the apparatus capacity resource. In step S103, the first URI can be generated according to the first apparatus identification and the device identification in the local capacity resource parameter. For example, as aforementioned, the first apparatus identification includes the user identification, the identification of the first autonomy environment to which the information distributing apparatus belongs and the second apparatus identification of the distributing apparatus in the first autonomy environment to which it belongs, so that the first URI may include the first apparatus identification including the user identification, the identification of the first autonomy environment to which the information distributing apparatus belongs and the second apparatus identification of the distributing apparatus in the first autonomy environment as well as the device identification in the first autonomy environment of the internal device and/or the peripheral device providing this item of the apparatus capacity resource. Further, the capacity resource distribution information of the apparatus capacity resource may also include the description parameters of this item of the apparatus capacity resource included in the local capacity resource parameter.

Further, according to one example of the present disclosure, in step S103, the capacity resource distribution information can be generated according to for example wide area network protocol such as HTTP protocol and/or XMPP protocol. For example, the user identification is User_ID, the identification of the first autonomy environment is LenovoDomain, and the second apparatus identification of the distributing apparatus in the first autonomy environment to which it belongs is PublisherID. The internal device and/or the peripheral device providing an item of the apparatus capacity resource are expressed as container, and the device identifications thereof in the first autonomy environment are Container_ID. The capacity resource distribution information generated according to HTTP protocol may be "http://LenovoDomain/User_ID/{PublisherID}/container/{Container_ID}/" and, the capacity resource distribution information generated according to XMPP protocol may be "User_ID@_LenovoDomain/{PublisherID}/container/{Container_ID}/". That is, though the capacity resource distribution information generated, according to HTTP protocol, is different from the capacity resource distribution information generated, according to XMPP protocol in format, the capacity resource distribution information generated according to HTTP protocol corresponds to the capacity resource distribution information generated according to XMPP protocol. The capacity resource distribution information generated according to HTTP protocol and the capacity resource distribution information generated according to XMPP protocol can be interconverted.

Back to FIG. 1, in step S104, the capacity resource distribution information of the apparatus capacity resource is sent to the first server through the wide area network. As aforementioned, in step S103, the capacity resource distribution information can be generated according to for example wide area network protocol such as HTTP protocol and/or XMPP protocol. Correspondingly, in step S104, the capacity resource distribution information of the apparatus capacity resource can be sent to the first server by using same protocol as the protocol used in step S103 through the wide area network, and wherein, the first server is a server using the same protocol as the protocol used in step S103. For example, when the capacity resource distribution information is generated according to HTTP protocol in step S103, in step S104, the capacity resource distribution information of the apparatus capacity resource is sent to the first server by using HTTP protocol through the wide area network, wherein the first server is the server using HTTP protocol. Also, for example, when the capacity resource distribution information is generated according to XMPP protocol in step S103, in step S104, the capacity resource distribution information of the apparatus capacity resource is sent to the first server by using XMPP protocol through the wide area network, wherein the first server is the server using XMPP protocol. Further, when the capacity resource distribution information is generated according to HTTP protocol XMPP protocol respectively in step S103, in step S104, the capacity resource distribution information of corresponding format is sent to the first server using HTTP protocol and the first server using XMPP protocol by using HTTP protocol and XMPP protocol respectively through the wide area network.

As aforementioned, according to one example of the present disclosure, the information distributing apparatus can be connected to the wide area network directly, and carries out data transmission with the server through the wide area network. In this case, the information distributing apparatus has wide area network address that can be recognized in the wide area network, and in step S104, the information distributing apparatus can send the capacity resource distribution information of the apparatus capacity resource to the first server directly. For example, the user identification is User_ID, the identification of the first autonomy environment is LenovoDomain, and the second apparatus identification of the distributing apparatus in the first autonomy environment to which it belongs is PublisherID. The wide area network address of the information distributing apparatus according to HTTP protocol may be "http://LenovoDomain/User_ID/{PublisherID}/", and the wide area network address of the information distributing apparatus according to XMPP protocol may be "User_ID@LenovoDomain/{PublisherID}/". Alternatively, in case that the information distributing apparatus cannot be connected to the wide area network directly, in step S104, the capacity resource distribution information of the apparatus capacity resource can be sent to the first server through the wide area network via an agency apparatus, which is connected to the wide area network in the first autonomy environment, wherein the agency apparatus has the wide area network address that can be used in the wide area network. In this example, the agency apparatus is for forwarding the distribution information such as the capacity resource distribution information from the information distributing apparatus when the information distributing apparatus does not have the wide area network address that can be used in the wide area network.

With the solution provided by the embodiment, the user does not need to install special application for being interconnected with other apparatus in the terminal apparatus and does not need to know the intercommunication protocol between a lot of apparatuses, and the usage mode of different application software or the like. By sending the capacity resource distribution information to the server by using the conventional wide area network protocol, the user can easily know and control the shared device capacity resource that the respective terminal apparatuses have, and then implement the sharing of the apparatus capacity resource between the respective apparatuses.

Further, according to another example of the present disclosure, there may be terminal apparatus that cannot be used as the information distributing apparatus in first autonomy environment. In this case, the method shown in FIG. 1 may further include receiving a third apparatus identification in the first autonomy environment from the terminal apparatus in the first autonomy environment to which the distributing apparatus belongs and remote end capacity resource parameter of at least one item of the apparatus capacity resource of the terminal apparatus. Similar to the local capacity resource parameter, each item of the remote end capacity resource parameter may include description parameter of this item, of the apparatus capacity resource, of the terminal apparatus, and the device identification in the first autonomy environment of the internal device of the terminal apparatus and/or the peripheral device connected with the terminal apparatus, providing this item of the apparatus capacity resource.

The capacity resource distribution information of this item of the apparatus capacity resource of the terminal apparatus can be generated according to the first apparatus identification obtained in step S101 as well as the third apparatus identification and the remote end capacity resource parameter of each item of the apparatus capacity resource of the terminal apparatus. Then, the capacity resource distribution information of the terminal apparatus is sent to the first server through the wide area network to ensure that all of the apparatus capacity resource of the terminal apparatus in the first autonomy environment can be sent to the server of the wide area network. The user can then carry out control operation to the terminal apparatus, and the peripheral apparatus thereof in the first autonomy environment through the wide area network when the user is in other autonomy environment.

Similar to the local capacity resource parameter, the capacity resource distribution information of this item of the apparatus capacity resource of the terminal apparatus can be generated according to for example the wide area network protocol such as HTTP protocol and/or XMPP protocol. The capacity resource distribution information of this item of the apparatus capacity resource may include a third universal resource identifier (URI), wherein, the third URI indicates the operation address of the device providing this item of the apparatus capacity resource of the terminal apparatus.

Further, according to another example of the present disclosure, after sending the capacity resource distribution information of the apparatus capacity resource to the first server through the wide area network, the method shown in FIG. 1 may further include receiving a capacity resource access request. The capacity resource access request may include an URI of the apparatus capacity resource needed to be used, determining the target apparatus capacity resource, corresponding to the capacity resource access request in the apparatus capacity resource, according to the capacity resource distribution information, and executing the capacity resource access request through the target apparatus capacity resource.

According to one example of the present disclosure, the access mode to the apparatus capacity resource can be defined in advance. For example, the capacity resource access request to the printer as the apparatus capacity resource may be different description for printing one page and printing multiple pages. For example, it can be defined by the description such as <print>, <print all>, <query> at the time of defining the capacity resource access request. When the operation to the apparatus capacity resource is carried out subsequently, it may require that the operating command is sent to the entity of the resource operation described by new URI formed by URI+<print> of the apparatus capacity resource to be executed.

Figure 2:
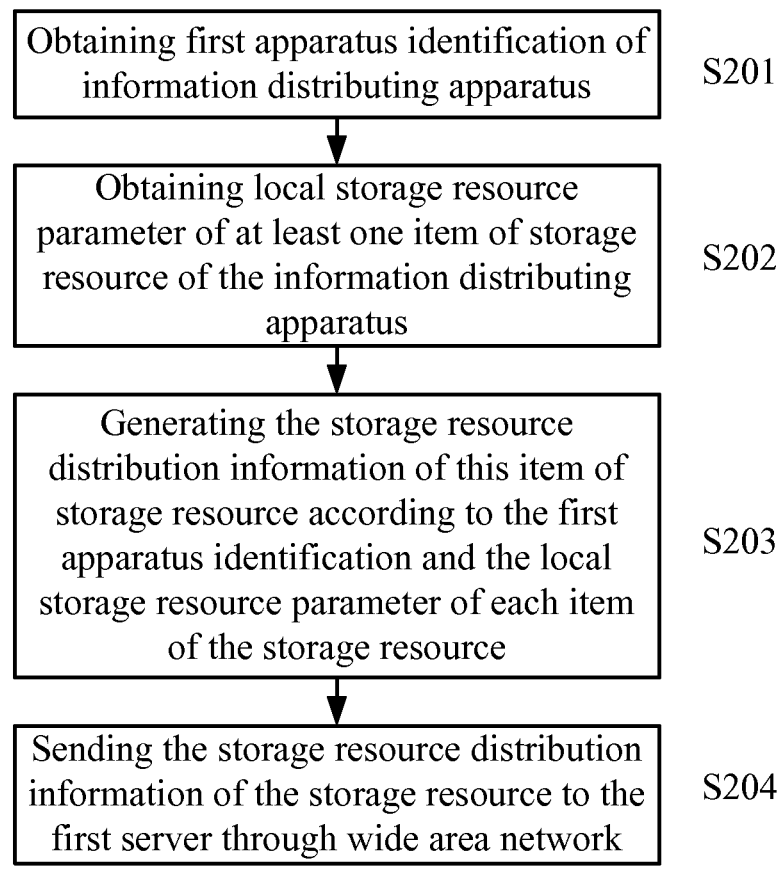
FIG. 2 is a flow chart illustrating the method for managing an apparatus according to a second embodiment of the present disclosure.

FIG. 2 is a flow chart illustrating the method 200 for managing apparatus according to a second embodiment of the present disclosure. The method 200 for managing apparatus can be applied in the above-described information distributing apparatus. As shown in FIG. 2, in step S201, a first apparatus identification of the information distributing apparatus is obtained, wherein, the first apparatus identification includes a user identification, an identification of a first autonomy environment to which the information distributing apparatus belongs, and a second apparatus identification of the distributing apparatus in the first autonomy environment to which it belongs. According to one example of the present disclosure, the user identification may be a user name, and more particularly, the user identification may be the user name used when the user registers in the server in the wide area network.

In step S202, a local storage resource parameter of at least one item of storage resource of the information distributing apparatus is obtained. The local storage resource parameter may include a description parameter of this item of the storage resource as well as a storage identification of the storage resource in the first autonomy environment. Further, the storage resource may include one or more of the following items: local data stored in the information distributing apparatus, data entry information stored in relation database of the information distributing apparatus, data stream generated in the information distributing apparatus, and remote end data stored in a second server that can be connected with the information distributing apparatus. Further, according to one example of the present disclosure, the storage resource may include all or part of the contents of the above items.

For example, in case that the information distributing apparatus is a smart phone, the data entry information stored in the relation database of the information distributing apparatus may include contact person entry stored in the address book database of the smart phone. In addition, for example, the data stream generated in the information distributing apparatus may be preview and video collection data generated by the camera of the information distributing apparatus. The real-time positioning data generated by the positioning transducer (for example, global positioning system (GPS) module) of the information distributing apparatus, and/or the real-time voice record collected by the voice recording apparatus of the information distributing apparatus, and so on. Additionally, for example, the remote end data stored in the second server that can be connected with the information distributing apparatus may be data stored in the server of the wide area network such as net disk server.

Back to step S202, the local storage resource parameter of each item of the storage resource includes a description parameter of this item of the storage resource and a storage identification indicating the storage location of the storage resource with respect to the information distributing apparatus. According to one example of the present disclosure, the description parameter of the storage resource may include one or more of operation mode, resource type, file name, distributing time, update time of this item of the storage resource and the attribute description of the resource.

Then, in step S203, the storage resource distribution information of this item of the storage resource is generated according to the first apparatus identification and the local storage resource parameter of each item of the storage resource. According to one example of the present disclosure, the storage resource distribution information may include a second universal resource identifier (URI), wherein, the second URI indicates storage path of this item of the storage resource. In step S203, the second URI can be generated according to the first apparatus identification and storage identification in the local storage resource parameter. For example, as aforementioned, the first apparatus identification includes a user identification, an identification of the first autonomy environment to which the information distributing apparatus belongs, and a second apparatus identification of the distributing apparatus in the first autonomy environment to which it belongs, so that the second URI may include the first apparatus identification including the user identification, the identification of the first autonomy environment to which the information distributing apparatus belongs, and the second apparatus identification of the distributing apparatus in the first autonomy environment as well as the storage identification indicating the storage location of the storage resource with respect to the information distributing apparatus. Further, the storage resource distribution information of the storage resource may further include the description parameter of this item of the storage resource included in the local storage resource parameter.

Further, according to one example of the present disclosure, in step S203, the storage resource distribution information can be generated according to for example wide area network protocol such as HTTP protocol and/or XMPP protocol. For example, the user identification is User_ID, the identification of the first autonomy environment is LenovoDomain, the second apparatus identification of the distributing apparatus in the first autonomy environment to which it belongs is PublisherID, storage device storing one item of the storage resource in the information distributing apparatus or a second server connected with the information distributing apparatus is expressed as storage, the storage identification indicating the storage location of the storage resource with respect to the information distributing apparatus is storage_loc, i.e., storage logic of the storage resource with respect to the information distributing apparatus. the storage resource distribution information generated according to HTTP protocol may be "http://LenovoDomain:User_ID/{PublisherID}/storage/{Storage_Loc}/", and the storage resource distribution information generated according to XMPP protocol may be "User_ID@LenovoDomain/{PublisherID}/storage/{Storage_Loc}/". That is, though the storage resource distribution information generated, according to HTTP protocol, is different from the storage resource distribution information generated, according to XMPP protocol in format, the storage resource distribution information generated according to HTTP protocol corresponds to the storage resource distribution information generated according to XMPP protocol. The storage resource distribution information generated according to HTTP protocol, and the storage resource distribution information generated according to XMPP protocol can be interconverted.

Back to FIG. 2, in step S204, the storage resource distribution information of the apparatus capacity resource is sent to the first server through the wide area network. As aforementioned, in step S203, the storage resource distribution information can be generated according to for example wide area network protocol such as HTTP protocol and/or XMPP protocol. Correspondingly, in step S204, the storage resource distribution information of the storage resource can be sent to the first server by using same protocol as the protocol used in step S203 through the wide area network, and wherein, the first server is a server using the same protocol as the protocol used in step S203. For example, when the storage resource distribution information is generated according to HTTP protocol in step S203, in step S204, the storage resource distribution information of the storage resource is sent to the first server by using HTTP protocol through the wide area network, wherein the first server is the server using HTTP protocol. Also, for example, when the storage resource distribution information is generated according to XMPP protocol in step S203, in step S204, the storage resource distribution information of the storage resource is sent to the first server by using XMPP protocol through the wide area network, wherein the first server is the server using XMPP protocol. Further, when the storage resource distribution information is generated according to HTTP protocol XMPP protocol respectively in step S203, in step S204, the storage resource distribution information of corresponding format is sent to the first server using HTTP protocol and the first server using XMPP protocol by using HTTP protocol and XMPP protocol respectively through the wide area network.

As aforementioned, according to one example of the present disclosure, the information distributing apparatus can be connected to the wide area network directly, and carries out data transmission with the server through the wide area network. In this case, the information distributing apparatus has wide area network address that can be recognized in the wide area network, and in step S204, the information distributing apparatus can send the storage resource distribution information of the storage resource to the first server directly. For example, the user identification is User_ID, the identification of the first autonomy environment is LenovoDomain, and the second apparatus identification of the distributing apparatus in the first autonomy environment to which it belongs is PublisherID. the wide area network address of the information distributing apparatus according to HTTP protocol may be "http://LenovoDomain/User_ID/{PublisherID}/", and the wide area network address of the information distributing apparatus according to XMPP protocol may be "User_ID@LenovoDomain/{PublisherID}/". Alternatively, in case that the information distributing apparatus cannot be connected to the wide area network directly, in step S204, the storage resource distribution information of the storage resource can be sent to the first server through the wide area network via an agency apparatus connected to the wide area network in the first autonomy environment. The agency apparatus has the wide area network address that can be used in the wide area network. In this example, the agency apparatus is for forwarding the distribution information such as the capacity resource distribution information from the information distributing apparatus when the information distributing apparatus does not have the wide area network address that can be used in the wide area network.

With the solution provided by the embodiment, the user does not need to install a special application for being interconnected with other apparatus in the terminal apparatus and does not need to know the intercommunication protocol between a lot of apparatuses, and the usage mode of different application software or the like. By sending the storage resource distribution information to the server by using the conventional wide area network protocol, the user can access the storage resource stored in the respective terminal apparatus easily, and then implement the sharing of the storage resource between the respective apparatuses.

Further, according to another example of the present disclosure, there may be a terminal apparatus that cannot be used as the information distributing apparatus in first autonomy environment. In this case, the method shown in FIG. 2 may further include receiving a third apparatus identification in the first autonomy environment from the terminal apparatus in the first autonomy environment to which the distributing apparatus belongs and remote end storage resource parameter of at least one item of storage resource of the terminal apparatus. Similar to the local storage resource parameter, each item of the remote end storage resource parameter may include description parameters of this item of the storage resource of the terminal apparatus and storage identification indicating storage location of the storage resource with respect to the terminal apparatus.

The storage resource distribution information of this item of the storage resource of the terminal apparatus can be generated according to the first apparatus identification obtained in step S201 as well as the third apparatus identification and the remote end storage resource parameter of each item of the storage resource of the terminal apparatus. Then, the storage resource distribution information of the terminal apparatus is sent to the first server through the wide area network to ensure that all of the storage resource of the terminal apparatus in the first autonomy environment can be sent to the server of the wide area network. The user can acquire the storage resource of the terminal apparatus in the first autonomy environment through the wide area network when the user is in other autonomy environment.

Similar to the local storage resource parameter, the storage resource distribution information of this item of the storage resource of the terminal apparatus can be generated according to for example the wide area network protocol such as HTTP protocol and/or XMPP protocol. The storage resource distribution information of this item of the storage resource may include a fourth universal resource identifier (URI), wherein, the fourth URI indicates storage path providing this item of the storage resource of the terminal apparatus.

Further, according to another example of the present disclosure, after sending the storage resource distribution information of the storage resource to the first server through the wide area network, the method, shown in FIG. 2, may further include receiving a storage resource access request. The storage resource access request may include an URI of the storage resource that wishes to acquire; determining target storage path of target storage resource corresponding to the storage resource access request in the storage resource according to the storage resource distribution information; and then acquiring the target storage resource according to the target storage path.

Figure 3:
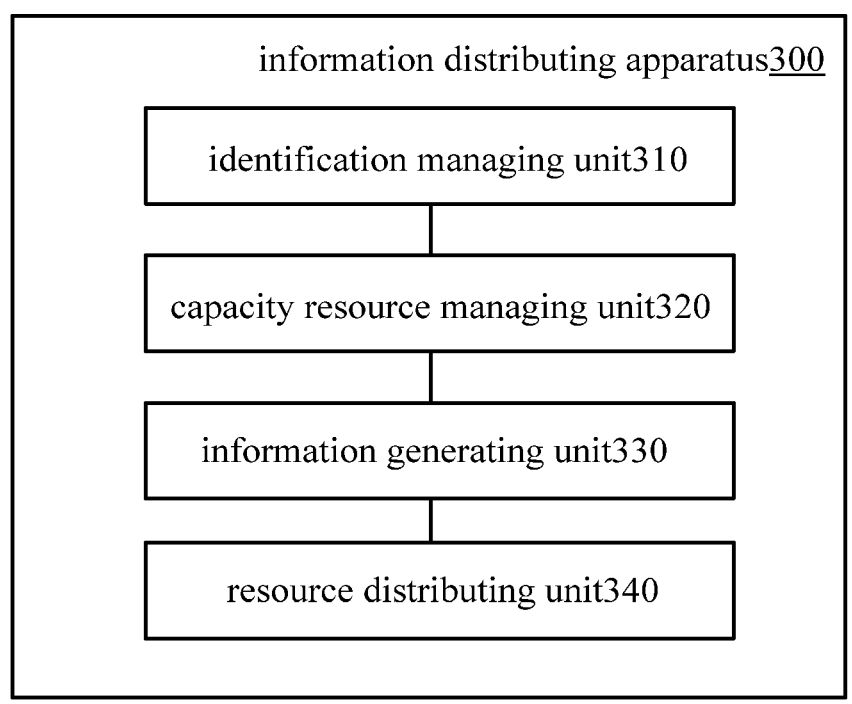
FIG. 3 is a schematic structural block diagram of the information distributing apparatus according to the first embodiment of the present disclosure.

Hereinafter, the information distributing apparatus of the first embodiment of the present disclosure is described with reference to FIG. 3. FIG. 3 is a schematic structural block diagram of the information distributing apparatus 300 according to the first embodiment of the present disclosure. As shown in FIG. 3, the information distributing apparatus 300 of the embodiment includes an identification managing unit 310, a capacity resource managing unit 320, an information generating unit 330, and a resource distributing unit 340.

The respective units of the information distributing apparatus 300 execute the above-described respective steps/functions of the method for managing apparatus of FIG. 1, therefore, it will no longer be described for the sake of simplicity.

For example, the identification managing unit 310 can obtain the first apparatus identification of the information distributing apparatus, wherein, the first apparatus identification includes the user identification, the identification of the first autonomy environment to which the information distributing apparatus belongs, and the second apparatus identification of the distributing apparatus in the first autonomy environment to which it belongs. According to one example of the present disclosure, the user identification may be a user name, and more particularly, the user identification may be the user name used when the user registers in the server in the wide area network.

The capacity resource managing unit 320 can obtain the local capacity resource parameter of at least one item of the apparatus capacity resource of the information distributing apparatus. The apparatus capacity resource is capacity provided by the internal device that the information distributing apparatus has and/or peripheral device connected to the information distributing apparatus, for example, printing, taking photo, recording, video/audio playing, GPS information acquiring, keyboard control, network access, and so on.

According to one example of the present disclosure, the internal device that the information distributing apparatus has may be the device included in the information distributing apparatus itself, for example, the display device, modem, GPS device of the information distributing apparatus, or the like. According to another example of the present disclosure, the peripheral device can be connected to the information distributing apparatus through cable directly, and alternatively, the peripheral device can be interconnected with the information distributing apparatus via LAN. Optionally, the peripheral device may be interconnected with the information distributing apparatus based on protocols such as universal plug and play protocol (UPnP) leaded by Microsoft Corporation, short distance interconnection protocol (Alljoyn) of Qualcomm corporation, short distance interconnection protocol (Bonjour and Airplay) of Apple corporation and Simple Network Management based Protocol (SNMP), and intelligent grouping and resource sharing protocol (IGRS) of Lenovo corporation. For example, the peripheral device may be smart TV, router, printer, digital camera or the like based on the above-described protocol.

According to one example of the present disclosure, the apparatus capacity resource includes all of the functions that can be provided by the internal device of the distributing apparatus and/or the peripheral device. Further, the apparatus capacity resource includes part of the functions that can be provided by the internal device of the distributing apparatus and/or the peripheral device. For example, the internal device of the distributing apparatus may provide storage function, and the internal device has five storage modules. The user may set all of the 5 storage modules as the apparatus capacity resource that can be distributed through the apparatus capacity resource as necessary, and alternatively, the user may set only 3 storage modules out of all of the 5 storage modules as the apparatus capacity resource that can be distributed through the apparatus capacity resource Further, the local capacity resource parameter of each item of the apparatus capacity resource includes the description parameter of this item of the apparatus capacity resource and the device identification of the internal device and/or the peripheral device providing this item of the apparatus capacity resource in the first autonomy environment. According to one example of the present disclosure, the description parameters of the apparatus capacity resource may include one or more of the operation mode, resource type, resource name, distribution expiry date of the resource, description of the access method of the resource, the attribute description of the resource, and the device name of this item of the apparatus capacity resource.

The information generating unit 330 can generate the capacity resource distribution information of this item of the apparatus capacity resource according to the first apparatus identification and the local capacity resource parameter of each item of the apparatus capacity resource. According to one example of the present disclosure, the capacity resource distribution information may include a first universal resource identifier (URI), wherein, the first URI indicates the operation address of the device providing this item of the apparatus capacity resource. The information generating unit 330 can generate the first URI according to the first apparatus identification and the device identification in the local capacity resource parameter. For example, as aforementioned, the first apparatus identification includes the user identification, the identification of the, first autonomy environment to which the information distributing apparatus belongs and the second apparatus identification of the distributing apparatus in the first autonomy environment to which it belongs, so that the first URI may include the first apparatus identification including the user identification, the identification of the first autonomy environment to which the information distributing apparatus belongs and the second apparatus identification of the distributing apparatus in the first autonomy environment as well as the device identification in the first autonomy environment of the internal device and/or the peripheral device providing this item of the apparatus capacity resource. Further, the capacity resource distribution information of the apparatus capacity resource may also include the description parameters of this item of the apparatus capacity resource included in the local capacity resource parameter.

Further, according to one example of the present disclosure, the information generating unit 330 can generate the capacity resource distribution information according to for example the wide area network protocol such as HTTP protocol and/or XMPP protocol. For example, the user identification is User_ID, the identification of the first autonomy environment is LenovoDomain, and the second apparatus identification of the distributing apparatus in the first autonomy environment to which it belongs is PublisherID. The internal device and/or the peripheral device providing an item of the apparatus capacity resource are expressed as container, and the device identifications thereof in the first autonomy environment are Container_ID. The capacity resource distribution information generated according to HTTP protocol may be "http://LenovoDomain/User_ID/container/{Container_ID}/" and, the capacity resource distribution information generated according to XMPP protocol may be"User_ID@ LenovoDomain/{PublisherID}/container/{Container_ID}/". That is, though the capacity resource distribution information generated, according to HTTP protocol, is different from the capacity resource distribution information generated, according to XMPP protocol, in format, the capacity resource distribution information generated according to HTTP protocol corresponds to the capacity resource distribution information generated according to XMPP protocol. The capacity resource distribution information generated according to HTTP protocol, and the capacity resource distribution information generated according to XMPP protocol can be inter-converted.

Back to FIG. 3, the resource distributing unit 340 can send the capacity resource distribution information of the apparatus capacity resource to the first server through the wide area network. As aforementioned, the information generating unit 330 can generate the capacity resource distribution information according to for example the wide area network protocol such as HTTP protocol and/or XMPP protocol. Correspondingly, the resource distributing unit 340 can send the capacity resource distribution information of the apparatus capacity resource using a same protocol as the protocol used by the information generating unit 330 through the wide area network, and wherein the first server is the server using the same protocol as the protocol used by the information generating unit 330. For example, when the information generating unit 330 generates the capacity resource distribution information according to HTTP protocol, the resource distributing unit 340 sends the capacity resource distribution information of the apparatus capacity resource to the first server by using HTTP protocol through the wide area network, wherein the first server is the server using HTTP protocol. Also, for example, when the information generating unit 330 generates the capacity resource distribution information according to XMPP protocol, the resource distributing unit 340 sends the capacity resource distribution information of the apparatus capacity resource to the first server by using XMPP protocol through the wide area network, wherein the first server is the server using XMPP protocol. Further, when the information generating unit 330 generates the capacity resource distribution information, according to HTTP protocol and XMPP protocol respectively, the resource distributing unit 340 sends the capacity resource distribution information having corresponding format to the first server using HTTP protocol, and the first server using XMPP protocol by using HTTP protocol and XMPP protocol, respectively, through the wide area network.

As aforementioned, according to one example of the present disclosure, the information distributing apparatus can be connected to the wide area network directly, and carries out data transmission with the server through the wide area network. In this case, the information distributing apparatus has wide area network address that can be recognized in the wide area network, and the resource distributing unit 340 can send the capacity resource distribution information of the apparatus capacity resource to the first server directly. For example, the user identification is User_ID, the identification of the first autonomy environment is LenovoDomain, and the second apparatus identification of the distributing apparatus in the first autonomy environment to which it belongs is PublisherID. The wide area network address of the information distributing apparatus according to HTTP protocol may be "http://LenovoDomain/User_ID/{PublisherID}/", and the wide area network address of the information distributing apparatus according to XMPP protocol may be "User_ID@LenovoDomain/{PublisherID}/". Alternatively, in case that the information distributing apparatus cannot be connected to the wide area network directly, the resource distributing unit 340 can send the capacity resource distribution information of the apparatus capacity resource to the first server through the wide area network via an agency apparatus connected to the wide area network in the first autonomy environment, wherein, the agency apparatus has the wide area network address that can be used in the wide area network. In this example, the agency apparatus is for forwarding the distribution information such as the capacity resource distribution information from the information distributing apparatus when the information distributing apparatus does not have the wide area network address that can be used in the wide area network.

With the solution provided by the embodiment, the user does not need to install special application for being interconnected with other apparatus in the terminal apparatus and does not need to know the intercommunication protocol between a lot of apparatuses, and the usage mode of different applications software or the like. By sending the capacity resource distribution information to the server by using the conventional wide area network protocol, the user can know and control the shared device capacity resource that the respective terminal apparatus has easily, and then implement the sharing of the apparatus capacity resource between the respective apparatuses.

Further, according to another example of the present disclosure, there may be a terminal apparatus that cannot be used as the information distributing apparatus in first autonomy environment. In this case, the information generating unit 330 shown in FIG. 3 may further receive a third apparatus identification in the first autonomy environment from the terminal apparatus in the first autonomy environment to which the distributing apparatus belongs and remote end capacity resource parameter of at least one item of the apparatus capacity resource of the terminal apparatus. Similar to the local capacity resource parameter, each item of the remote end capacity resource parameter may include a description parameter of this item, of the apparatus capacity resource, of the terminal apparatus, of the device identification in the first autonomy environment, and of the internal device of the terminal apparatus and/or the peripheral device connected with the terminal apparatus providing this item of the apparatus capacity resource.

Further, information generating unit 330 further generates the capacity resource distribution information of this item of the apparatus capacity resource of the terminal apparatus according to the first apparatus identification obtained as well as the third apparatus identification and the remote end capacity resource parameter of each item of the apparatus capacity resource of the terminal apparatus. Then, the resource distributing unit 340 can, by sending the capacity resource distribution information of the terminal apparatus to the first server through the wide area network, ensure that all of the apparatus capacity resource of the terminal apparatus in the first autonomy environment can be sent to the server of the wide area network. The user can carry out control operation to the terminal apparatus and the peripheral apparatus thereof in the first autonomy environment through the wide area network when the user is in other autonomy environment.

Similar to the local capacity resource parameter, the information generating unit 330 can generate the capacity resource distribution information of this item of the apparatus capacity resource of the terminal apparatus according to for example the wide area network protocol such as HTTP protocol and/or XMPP protocol. The capacity resource distribution information of this item of the apparatus capacity resource may include a third universal resource identifier (URI), wherein, the third URI indicates the operation address of the device providing this item of the apparatus capacity resource of the terminal apparatus.

Further, according to another example of the present disclosure, the information distributing apparatus may further include a receiving unit and a first request managing unit. The receiving unit can receive the capacity resource access request after sending the capacity resource distribution information of the apparatus capacity resource to the first server through the wide area network, wherein the capacity resource access request can include URI of the apparatus capacity resource needed to be used. The first request managing unit can determine the target apparatus capacity resource corresponding to the capacity resource access request in the apparatus capacity resource according to the capacity resource distribution information, and execute the capacity resource access request through the target apparatus capacity resource. Hereinafter, it will be further described with reference to FIG. 4.

Figure 4:
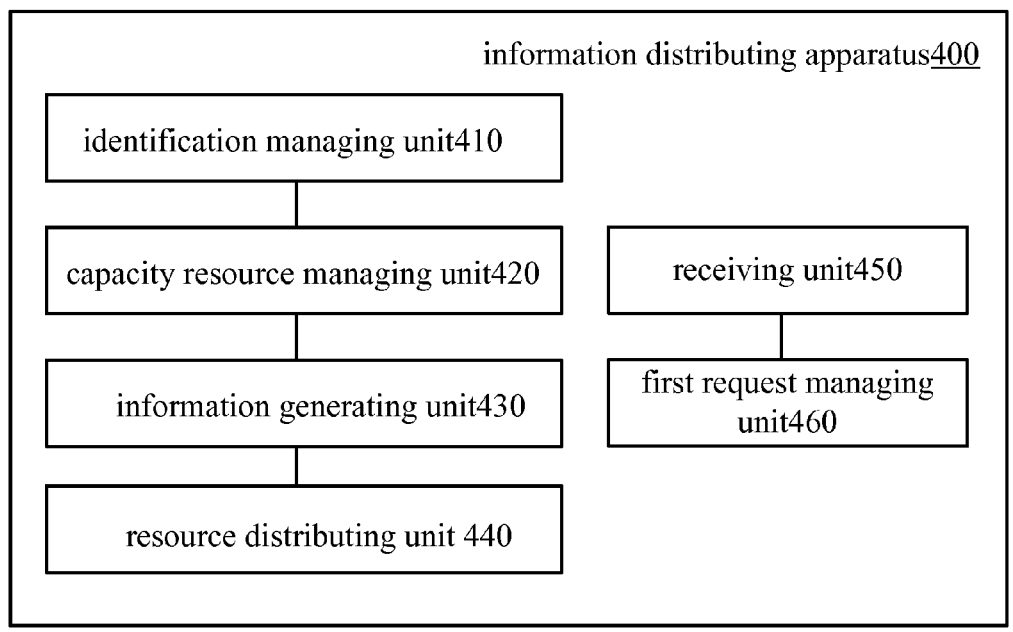
FIG. 4 is a schematic structural block diagram of the information distributing apparatus according to the second embodiment of the present disclosure.

FIG. 4 is a schematic structural block diagram of the information distributing apparatus 400 according to the second embodiment of the present disclosure. As shown in FIG. 4, the information distributing apparatus 400 can include an IGRS identification managing unit 410, a capacity resource managing unit 420, an information generating unit 430, and a resource distributing unit 440. Similar to the identification managing unit 310, the capacity resource managing unit 320, the information generating unit 330 and the resource distributing unit 340 in the information distributing apparatus 300 shown in FIG. 3. As above mentioned, in the first autonomy environment, the information distributing apparatus 400 can be interconnected with other terminal apparatus and peripheral apparatus based on the Intelligent Grouping and Resource Sharing (IGRS) protocol. Therefore, in this embodiment, the identification managing unit 410 is an IGRS identification managing unit. The capacity resource managing unit 420, the information generating unit 430 and the resource distributing unit 440 are similar to the capacity resource managing unit 320, the information generating unit 330 and the resource distributing unit 340, so they are no longer described in detail here.

Further, the information distributing apparatus 400 also includes a receiving unit 450 and a first request managing unit 460. The receiving unit 450 receives the capacity resource access request after sending the capacity resource distribution information of the apparatus capacity resource to the first server through the wide area network, wherein the capacity resource access request may include URI of the apparatus capacity resource needed to be used, and the capacity resource access request may be access request based on XMPP and HTTP standards from the wide area network. The first request managing unit 460 can determine the target apparatus capacity resource corresponding to the capacity resource access request in the apparatus capacity resource according to the capacity resource distribution information, and execute the capacity resource access request through the target apparatus capacity resource.

Figure 5:
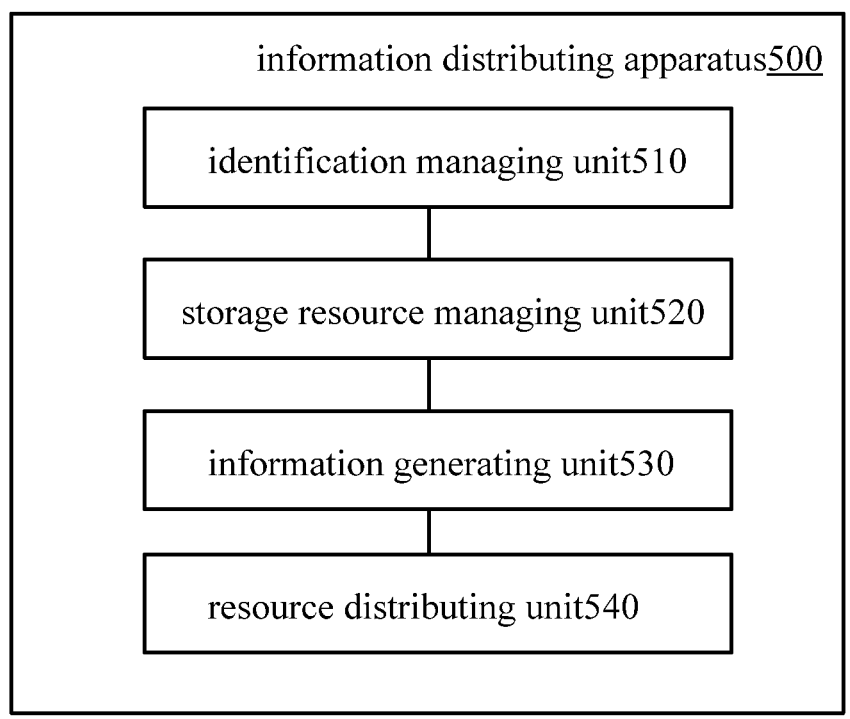
FIG. 5 is a schematic structural block diagram illustrating the information distributing apparatus according to the third embodiment of the present disclosure.

Hereinafter, the information distributing apparatus according to the third embodiment of the disclosure will be explained with reference to FIG. 5. FIG. 5 is a schematic structural block diagram illustrating the information distributing apparatus according to the third embodiment of the present disclosure; As shown in FIG. 5, the information distributing apparatus 500 can include an identification managing unit 510, a storage resource managing unit 520, an information generating unit 530 and a resource distributing unit 540.

The respective modules of the information distributing apparatus 500 execute the above-described respective steps/functions of the display method of FIG. 2, therefore, it will no longer be described for the sake of simplicity.

Similar to the identification managing unit 310 in FIG. 3, the identification managing unit 510 can obtain the first apparatus identification of the information distributing apparatus, wherein, the first apparatus identification includes the user identification, the identification of the first autonomy environment to which the information distributing apparatus belongs, and the second apparatus identification of the distributing apparatus in the first autonomy environment to which it belongs. According to one example of the present disclosure, the user identification may be a user name, and more particularly, the user identification may be the user name used when the user registers in the server in the wide area network.

The storage resource managing unit 520 can obtain the local storage resource parameter of at least one item of the storage resource of the information distributing apparatus. The local storage resource parameter may include the description parameter of this item of the storage resource as well as the storage identification of the storage resource in the first autonomy environment. Further, the storage resource may include one or more of the following items: local data stored in the information distributing apparatus, data entry information stored in relation database of the information distributing apparatus, data stream generated in the information distributing apparatus, and remote end data stored in a second server that can be connected with the information distributing apparatus. Further, according to one example of the present disclosure, the storage resource may include all or part of the contents of the above items.

For example, in case that the information distributing apparatus is a smart phone, the data entry information stored in the relation database of the information distributing apparatus may include contact person entry stored in the address book database of the smart phone. Also, for example, the data stream generated in the information distributing apparatus may be preview and video collection data generated by the camera of the information distributing apparatus, the real-time positioning data generated by the positioning transducer (for example, global positioning system (GPS) module) of the information distributing apparatus, and/or the real-time voice record collected by the voice recording apparatus of the information distributing apparatus, and so on. In addition, for example, the remote end data stored in the second server that can be connected with the information distributing apparatus may be data stored in the server of the wide area network such as net disk server.

Further, the local storage resource parameter of each item of the storage resource includes description parameter of this item of the storage resource and the storage identification indicating the storage location of the storage resource with respect to the information distributing apparatus. According to one example of the present disclosure, the description parameter of the storage resource may include one or more of operation mode, resource type, file name, distributing time, update time of this item of the storage resource and the attribute description of the resource.

Then, the information generating unit 530 can generate the storage resource distribution information of this item of the storage resource according to the first apparatus identification and the local storage resource parameter of each item of the storage resource. According to one example of the present disclosure, the storage resource distribution information may include a second universal resource identifier (URI), wherein, the second URI indicates storage path of this item of the storage resource. The information generating unit 530 can generate the second URI according to the first apparatus identification and the storage identification in the local storage resource parameter. For example, as aforementioned, the first apparatus identification includes a user identification, an identification of the first autonomy environment to which the information distributing apparatus belongs, and a second apparatus identification of the distributing apparatus in the first autonomy environment to which it belongs, so that the second URI may include the first apparatus identification including the user identification, the identification of the first autonomy environment to which the information distributing apparatus belongs, and the second apparatus identification of the distributing apparatus in the first autonomy environment as well as the storage identification indicating the storage location of the storage resource with respect to the information distributing apparatus. Further, the storage resource distribution information of the storage resource may further include the description parameter of this item of the storage resource included in the local storage resource parameter.

Further, according to one example of the present disclosure, the information generating unit 530 can generate the storage resource distribution information according to for example the wide area network protocol such as HTTP protocol and/or XMPP protocol. For example, the user identification is User_ID, the identification of the first autonomy environment is LenovoDomain, the second apparatus identification of the distributing apparatus in the first autonomy environment to which it belongs is PublisherID, a storage device storing one item of the storage resource in the information distributing apparatus or a second server connected with the information distributing apparatus is expressed as storage, the storage identification indicating the storage location of the storage resource with respect to the information distributing apparatus is Storage_Loc, i.e., storage logic of the storage resource with respect to the information distributing apparatus. The storage resource distribution information generated according to HTTP protocol may be "http://LenovoDomain:User_ID/{PublisherID}/storage/{Storage_Loc}/", and the storage resource distribution information generated according to XMPP protocol may be "User_ID@LenovoDomain/{PublisherID}/storage/{Storage_Loc}/". That is, though the storage resource distribution information generated, according to HTTP protocol, is different from the storage resource distribution information generated, according to XMPP protocol, in format, the storage resource distribution information generated according to HTTP protocol corresponds to the storage resource distribution information generated according to XMPP protocol. The storage resource distribution information generated according to HTTP protocol and the storage resource distribution information generated according to XMPP protocol can be interconverted.

Back to FIG. 5, the resource distributing unit 540 can send the storage resource distribution information of the apparatus capacity resource to the first server through the wide area network. As aforementioned, the information generating unit 530 can generate the storage resource distribution information according to for example the wide area network protocol such as HTTP protocol and/or XMPP protocol. Correspondingly, the resource distributing unit 540 can send the storage resource distribution information of the storage resource using a same protocol as the protocol used by the information generating unit 530 through the wide area network, and wherein the first server is the server using the same protocol as the protocol used by the information generating unit 530. For example, when the information generating unit 530 generates the storage resource distribution information according to HTTP protocol, the resource distributing unit 540 sends the storage resource distribution information of the apparatus capacity resource to the first server by using HTTP protocol through the wide area network, wherein the first server is the server using HTTP protocol. For example, when the information generating unit 530 generates the storage resource distribution information according to XMPP protocol, the resource distributing unit 540 sends the storage resource distribution information of the apparatus capacity resource to the first server by using XMPP protocol through the wide area network, wherein the first server is the server using XMPP protocol. Further, when the information generating unit 530 generates the storage resource distribution information according to HTTP protocol and XMPP protocol respectively, the resource distributing unit 540 sends the storage resource distribution information having corresponding format to the first server using HTTP protocol and the first server using XMPP protocol by using HTTP protocol and XMPP protocol respectively through the wide area network.

As aforementioned, according to one example of the present disclosure, the information distributing apparatus can be connected to the wide area network directly, and carries out data transmission with the server through the wide area network. In this case, the information distributing apparatus has wide area network address that can be recognized in the wide area network, and the resource distributing unit 540 can send the storage resource distribution information of the storage resource to the first server directly. For example, the user identification is User_ID, the identification of the first autonomy environment is LenovoDomain, and the second apparatus identification of the distributing apparatus in the first autonomy environment to which it belongs is PublisherID. The wide area network address of the information distributing apparatus according to HTTP protocol may be "http://LenovoDomain/User_ID/{PublisherID}/", and the wide area network address of the information distributing apparatus according to XMPP protocol may be "User_ID@LenovoDomain/{PublisherID}/". Alternatively, in case that the information distributing apparatus cannot be connected to the wide area network directly, the resource distributing unit 540 can send the storage resource distribution information of the storage resource to the first server through the wide area network via an agency apparatus connected to the wide area network in the first autonomy environment, wherein, the agency apparatus has the wide area network address that can be used in the wide area network. In this example, the agency apparatus is for forwarding the distribution information such as the capacity resource distribution information from the information distributing apparatus when the information distributing apparatus does not have the wide area network address that can be used in the wide area network.

With the solution provided by the embodiment, the user does not need to install special application for being interconnected with other apparatus in the terminal apparatus and does not need to know the intercommunication protocol between a lot of apparatuses, and the usage mode of different application software or the like. By sending the storage resource distribution information to the server by using the conventional wide area network protocol, the user can access the storage resource stored in the respective terminal apparatus easily, and then implement the sharing of the storage resource between the respective apparatuses.

Further, according to another example of the present disclosure, there may be a terminal apparatus that cannot be used as the information distributing apparatus in first autonomy environment. In this case, the information generating unit 530 shown in FIG. 5 may further receive a third apparatus identification in the first autonomy environment from the terminal apparatus in the first autonomy environment to which the distributing apparatus belongs and remote end storage resource parameter of at least one item of storage resource of the terminal apparatus. Similar to the local storage resource parameter, each item of the remote end storage resource parameter may include description parameters of this item of the storage resource of the terminal apparatus and the storage identification indicating the storage location of the storage resource with respect to the terminal apparatus.

Further, information generating unit 530 further generates the storage resource distribution information of this item of the storage resource of the terminal apparatus according to the first apparatus identification obtained as well as the third apparatus identification and the remote end capacity resource parameter of each item of the apparatus capacity resource of the terminal apparatus. Then, the resource distributing unit 540 can further send the storage resource distribution information to the first server through the wide area network so as to ensure that all of the storage resource of the terminal apparatus in the first autonomy environment can be sent to the server of the wide area network. The user can acquire the storage resource of the terminal apparatus in the first autonomy environment through the wide area network when the user is in other autonomy environment.

Similar to the local storage resource parameter, the information generating unit 530 can generate the storage resource distribution information of this item of the storage resource of the terminal apparatus according to for example the wide area network protocol such as HTTP protocol and/or XMPP protocol. The storage resource distribution information of this item of the storage resource may include a fourth universal resource identifier (URI), wherein, the fourth URI indicates storage path providing this item of the storage resource of the terminal apparatus.

Further, according to another example of the present disclosure, the information distributing apparatus may further include a receiving unit and a second request managing unit. After sending the storage resource distribution information of the storage resource to the first server through the wide area network, the receiving unit can receive a storage resource access request, wherein the storage resource access request may include URI of the storage resource wishes to acquire. The second request managing unit can determine target storage path of target storage resource corresponding to the storage resource access request in the storage resource according to the storage resource distribution information; and then acquiring the target storage resource according to the target storage path.

Figure 6:
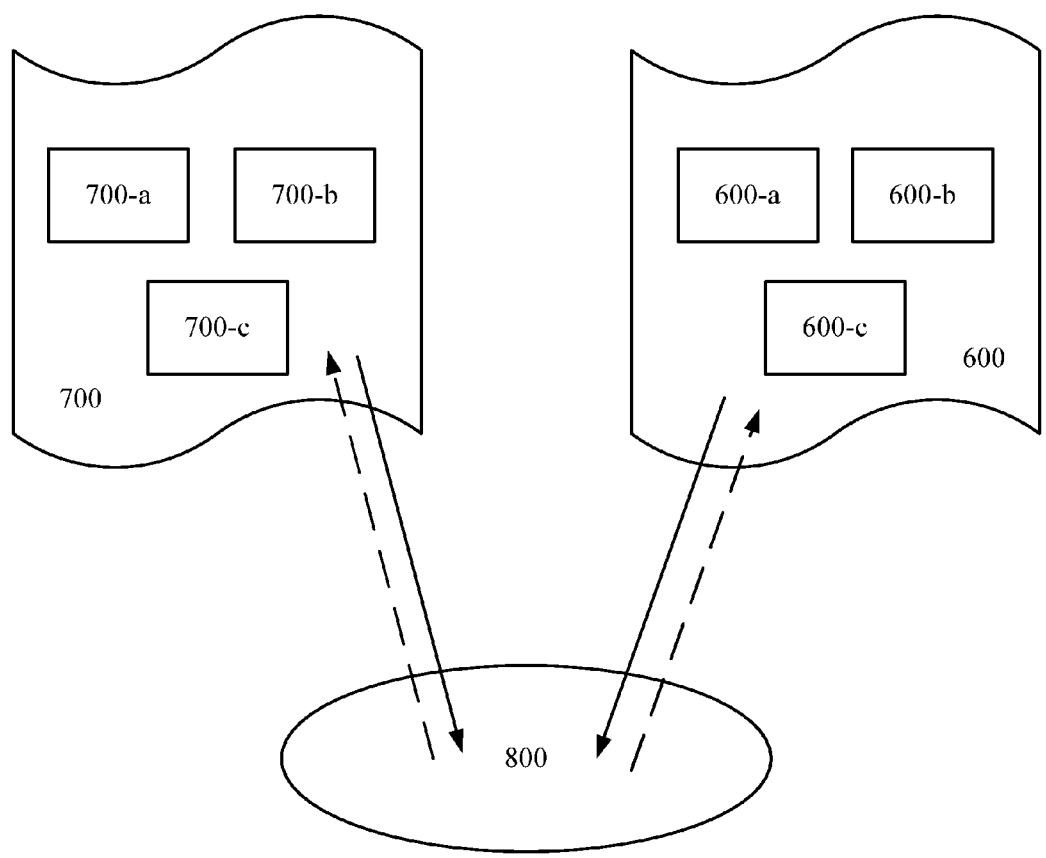
FIG. 6 is an explanatory diagram schematically illustrating an application scene of the information distributing apparatus shown in FIG. 5.

FIG. 6 is an exemplary diagram schematically illustrating an application scene of the information distributing apparatus 500, shown in FIG. 5. In the example shown in FIG. 6, there includes a plurality of information distributing apparatuses 600-*a*, 600-*b*, 600-*c* in the first autonomy environment 600, there includes a plurality of information distributing apparatuses 700-*a*, 700-*b*, 700-*c* in the second autonomy environment 700, wherein, the information distributing apparatuses 600-*a*, 600-*b*, 600-*c*, 700-*a*, 700-*b*, 700-*c* are similar to the information distributing apparatus 500 shown in FIG. 5, so they will be no longer described.

As shown by the solid arrow in FIG. 6, the information distributing apparatus 600-*a*, 600-*b*, 600-*c*, 700-*a*, 700-*b*, 700-*c* can send the storage resource distribution information to the server 800 in the wide area network respectively. When the user uses the information distributing apparatus 700-*b* in the second autonomy environment 700, it is determined that the storage resource wishes to acquire is in the information distributing apparatus 600-*a* in the first autonomy environment 600 according to the storage resource distribution information stored in the server 800, the information distributing apparatus 700-*b* sends the storage resource access request to the information distributing apparatus 600-*a* through the server 800, as shown by the dotted arrow from the server 800 pointing to the first autonomy environment 600 in FIG. 6. Wherein, the storage resource access request may include URI of the storage resource wishes to acquire. The first request managing unit in the distributing apparatus 600-*a* can determine the target storage path of the target storage resource corresponding to the storage resource access request in the storage resource according to the storage resource distribution information. Similarly, when the user uses the information distributing apparatus 600-*b* in the first autonomy environment 600, when it is determined that the storage resource wishes to acquire is in the information distributing apparatus 700-*a* in the second autonomy environment 700 according to the storage resource distribution information stored in the server 800, the information distributing apparatus 600-*b* sends the storage resource access request to the information distributing apparatus 700-*a* through the server 800, as shown by the dotted arrow from the server 800 pointing to the second autonomy environment 700 in FIG. 6. Wherein, the storage resource access request may include URI of the storage resource wishes to acquire. The first request managing unit in the distributing apparatus 700-*a* can determine the target storage path of the target storage resource corresponding to the storage resource access request in the storage resource according to the storage resource distribution information.

Those skilled in the art can understand the units and algorithm steps of the respective examples described in combination with the embodiments disclosed in the specification can be implemented by electronic hardware, computer software or the combination of them. Moreover, the software module can be in any form of computer storage medium. In order to explain the interchangeability of the hardware and software clearly, in the above-described explanation, the constitution and the steps of the respective examples are described generally according to the function. Whether these functions are executed by hardware or software is depending on the specific applications and design constraint of the technical solution. Those skilled in the art can implement the described function by using different methods for each specific application, and such implementations are not regarded as beyond the scope of the disclosure.

Those skilled in the art can understand that the disclosure can be made various modifications, combinations, partial combinations and alternation depending on the design need and other factors, so long as they are in the scope of the attached claims and the equivalents.

For example, according to one modified embodiment of the present disclosure, the information distributing apparatus can include the capacity resource managing unit 320 shown in FIG. 3 and the storage resource managing unit 520 at the same time. The information generating unit in the information distributing apparatus can generate the capacity resource distribution information of this item of the apparatus capacity resource according to the first apparatus identification and the local capacity resource parameter of each item of the apparatus capacity resource, and can generate the storage resource distribution information of this item of the storage resource according to the first apparatus identification and the local storage resource parameter of each item of the storage resource. Further, the resource distributing unit further can send the storage resource distribution information of the apparatus capacity resource as well as the storage resource distribution information of the storage resource to the first server through the wide area network.

As above-mentioned, in recent years, more and more terminal apparatuses of high capability such as personal computer, portable computer, tablet computer, smart phone, portable multimedia player, smart TV, or the like come into wide use. An individual user may have a plurality of such terminal apparatuses of high capability at the same time.

When the user carries out cooperation with a plurality of apparatuses, the present solution usually uses the apparatus operated currently as a center. For example, when a file stored in a cloud server needs to be printed by the mobile phone, the file needs to be downloaded to the mobile phone locally first, and then the file is transferred to PC, and then the PC initiates a print to pass to a printing apparatus. However, when other apparatus than the apparatus operated currently in the plurality of apparatus that can work cooperatively also have a strong processing capacity and/or network connecting capacity, usually the multiple apparatus cooperative processing scheme with the apparatus operated currently as the center is not the optimized processing scheme.

Further, the battery of the portable electronic apparatus such as smart phone, portable multimedia player is relatively small, and is short in time of endurance. When such portable electronic apparatus is used as the central apparatus of the multiple apparatus co-processing scheme, the power consumption of the usage of the apparatus is increased and the usage time of the portable electronic apparatus is reduced.

Therefore, the object of the embodiments of the present disclosure is further providing a method, a server, and a task initiating apparatus for controlling resource remotely to solve the above problem.

The present embodiment of the disclosure provides a method for controlling resource remotely applied in a first server, a capacity resource distribution information and a storage resource distribution information received from at least one information distributing apparatus through wide area network being stored in the first server, each item of the capacity resource distribution information including a first operation address that can be accessed through the wide area network of capacity providing device providing this item of capacity resource as well as the capacity description information of this item of capacity resource, each item of the storage resource distribution information including a first storage address that can be accessed through the wide area network of this item of the storage resource as well as storage description information of this item of the storage resource. The method includes receiving a remote operation instruction from the task initiating apparatus; obtaining at least one execution route for executing the remote operation instruction and atom motion included in each execution route according to the capacity resource distribution information and the storage resource distribution information, wherein the atom motion means an operation executed by one capacity providing device without being interrupted by application program scheduling mechanism; obtaining a first weighting score of each atom motion, wherein the first weighting score indicates the execution cost required by the atom motion; computing a second weighting score of each execution route according to the first weighting score of each atom motion, wherein the second weighting score indicates the execution cost required by the execution route; determining the execution route with the least execution cost as target execution route; determining the capacity providing device executing the atom motion included in the target execution route as target capacity providing device; and sending motion execution command for executing the corresponding atom motion to the target capacity providing device.

Another embodiment of the present disclosure provides a method for controlling resource remotely applied in a task initiating apparatus, and the method includes logging in a first server via wide area network; receiving capacity resource distribution information and storage resource distribution information stored in the first server from the first server, each item of the capacity resource distribution information including a first operation address of capacity providing device providing this item of capacity resource that can be accessed through the wide area network as well as capacity description information of this item of capacity resource, and each item of the storage resource distribution information including first storage address of this item of the storage resource that can be accessed through the wide area network as well as storage description information of this item of the storage resource, displaying the capacity resource distribution information and the storage resource distribution information received; receiving operation instruction from the user; determining whether the operation instruction is remote operation instruction; and sending the remote operation instruction to the first server when the operation instruction is the remote operation instruction, wherein, the first server obtains a target execution route for executing remote operation instruction and the atom motion included in the target execution route according to the capacity resource distribution information and the storage resource distribution information, determines the capacity providing device executing the atom motion included in the target execution route as target capacity providing device, and sends motion execution command for executing the corresponding atom motion to the target capacity providing device, the atom motion is an operation executed by one capacity providing device without being interrupted by application program schedule mechanism.

Yet another embodiment of the present disclosure provides a server, including a storing unit configured to store capacity resource distribution information and storage resource distribution information received from at least one information distributing apparatus through the wide area network, each item of the capacity resource distribution information including a first operation address of capacity providing device providing this item of capacity resource that can be accessed through the wide area network as well as capacity description information of this item of capacity resource, and each item of the storage resource distribution information including first storage address of this item of the storage resource that can be accessed through the wide area network as well as storage description information of this item of the storage resource; a receiving unit configured to receive remote operation instruction from task initiating apparatus; a parsing unit configured to obtain at least one execution route executing the remote operation instruction and atom motion included in each execution route according to the capacity resource distribution information and the storage resource distribution information, wherein the atom motion is an operation executed by one capacity providing device without being interrupted by the application program schedule mechanism; a first weighting unit configured to obtain a first weighting score of each atom motion, the first weighting score indicating execution costs required by the atom motion; a second weighting unit configured to compute a second weighting score of each execution route according to the first weighting score of each atom motion, the second weighting score indicating the execution cost required by the execution route; a route selecting unit configured to determine the execution route with the least execution cost as target execution route according to the second weighting score; a device determining unit configured to determine the capacity providing device executing the atom motion included in the target execution route as the target capacity providing device; and a sending unit configured to send motion execution command for executing the corresponding atom motion to the target capacity providing device.

Still yet another embodiment of the present disclosure provides a task initiating apparatus including a logging control unit configured to logging in the first server via the wide area network; a receiving unit configured to receive the capacity resource distribution information and the storage resource distribution information stored in the first server from the first server, each item of the capacity resource distribution information including the first operation address of the capacity providing device providing this item of capacity resource that can be accessed through the wide area network as well as the capacity description information of this item of capacity resource, and each item of the storage resource distribution information including the first storage address of this item of the storage resource that can be accessed through the wide area network as well as the storage description information of this item of the storage resource; a display unit configured to display the capacity resource distribution information and the storage resource distribution information received; an input unit configured to receive operation instruction from the user; an instruction determining unit configured to determine whether the operation instruction is remote operation instruction; and a sending unit configured to send the remote operation instruction to the first server when the operation instruction is the remote operation instruction, wherein, the first server obtains a target execution route for executing remote operation instruction and the atom motion included in the target execution route according to the capacity resource distribution information and the storage resource distribution information, determines the capacity providing device executing the atom motion included in the target execution route as target capacity providing device, and sends motion execution command for executing the corresponding atom motion to the target capacity providing device, the atom motion is an operation executed by one capacity providing device without being interrupted by application program schedule mechanism.

Further, one embodiment of the present disclosure also provides a task initiating apparatus including a display unit configured to the capacity resource distribution information and the storage resource distribution information of the terminal apparatus that can be accessed by the task initiating apparatus; an input unit configured to receive resource operation instruction of target resource in the capacity resource indicated by the capacity resource distribution information and the storage resource indicated by the storage resource distribution information from the user; and a sending unit configured to send resource operation instruction to the first server, the first server determining target terminal apparatus executing the resource operation instruction in the terminal apparatus according to the capacity resource distribution information and the storage resource distribution information.

In the above-described solution provided by the embodiments of the present disclosure, by storing the capacity resource distribution information and the storage resource distribution information in the server in advance, the server is made to have resource profile of all of the apparatus connected thereto and the peripheral device of the apparatus, thus, the server can convert the remote operation instruction from the task initiating apparatus into a shortest route search problem of a weighting value network, so as to implement effective event assignation in distributed environment. Therefore, upon cooperation, a plurality of apparatuses do not need to use the apparatus operated currently as the center, such that the usage power consumption of the apparatus is reduced, and the usage time of the mobile apparatus is increased. Further, with the solution provided by the above-described embodiments of the present disclosure, the task initiated by the task initiating apparatus in a large scale apparatus distribution can be executed effectively even in a complicate network environment.

Hereinafter, the fourth embodiment and the fifth embodiment of the present disclosure are described in detail with reference to the accompanying drawings.

In the following embodiments of the present disclosure, the capacity resource distribution information and the storage resource distribution information of the information distributing apparatus and/or other terminal apparatus connected to the information distributing apparatus received from at least one information distributing apparatus through the wide area network are stored in the first server. Each item of the capacity resource distribution information includes the first operation address of the capacity providing device providing this item of capacity resource that can be accessed by the wide area network as well as the capacity description information of this item of capacity resource, and each item of the storage resource distribution information includes the first storage address of this item of the storage resource that can be accessed through the wide area network as well as the storage description information of this item of the storage resource.

In the embodiments of the present disclosure, the specific form of the information distributing apparatus and the terminal apparatus include, but not limited to smart phone, personal computer, personal digital assistant, portable computer, tablet computer, portable multimedia player, smart TV, and so on. According to one example of the present disclosure, the information distributing apparatus can be connected to the wide area network directly, and carries out data transmission with the server through the wide area network. In this case, the information distributing apparatus has wide area network address that can be recognized in the wide area network. Alternatively, according to another example of the present disclosure, the information distributing apparatus cannot be connected to the wide area network directly. In this case, the information distributing apparatus can carry out-data transmission with the server in the wide area network via agency apparatus connected to the wide area network in the first autonomy environment, wherein, the agency apparatus has the wide area network address that can be used in the wide area network.

Further, in an embodiment of the present disclosure, the autonomy environment means local area net environment constituted by at least one terminal apparatus interconnected with each other and peripheral apparatus connected to the corresponding terminal apparatus. As described below, in the autonomy environment, there is at least one information distributing apparatus to manage and distribute capacity resource distribution information of apparatus capacity resource that terminal apparatus has to the wide area network. According to one example of the present disclosure, each terminal apparatus can be used as the information distributing apparatus. Alternatively, in an autonomy environment, a specific terminal apparatus can be set as the information distributing apparatus in advance, other terminal apparatus sends the capacity resource distribution information of the apparatus capacity resource thereof to the information distributing apparatus, and sends to the server through the information distributing apparatus. Optionally, according to another example of the present disclosure, the respective terminal apparatus and peripheral apparatus connected to the corresponding terminal apparatus in the autonomy environment can be interconnected based on the Intelligent Grouping and Resource Sharing (IGRS) protocol. According to another example of the present disclosure, the autonomy environment may be wired or wireless local area networks environment.

Figure 7:
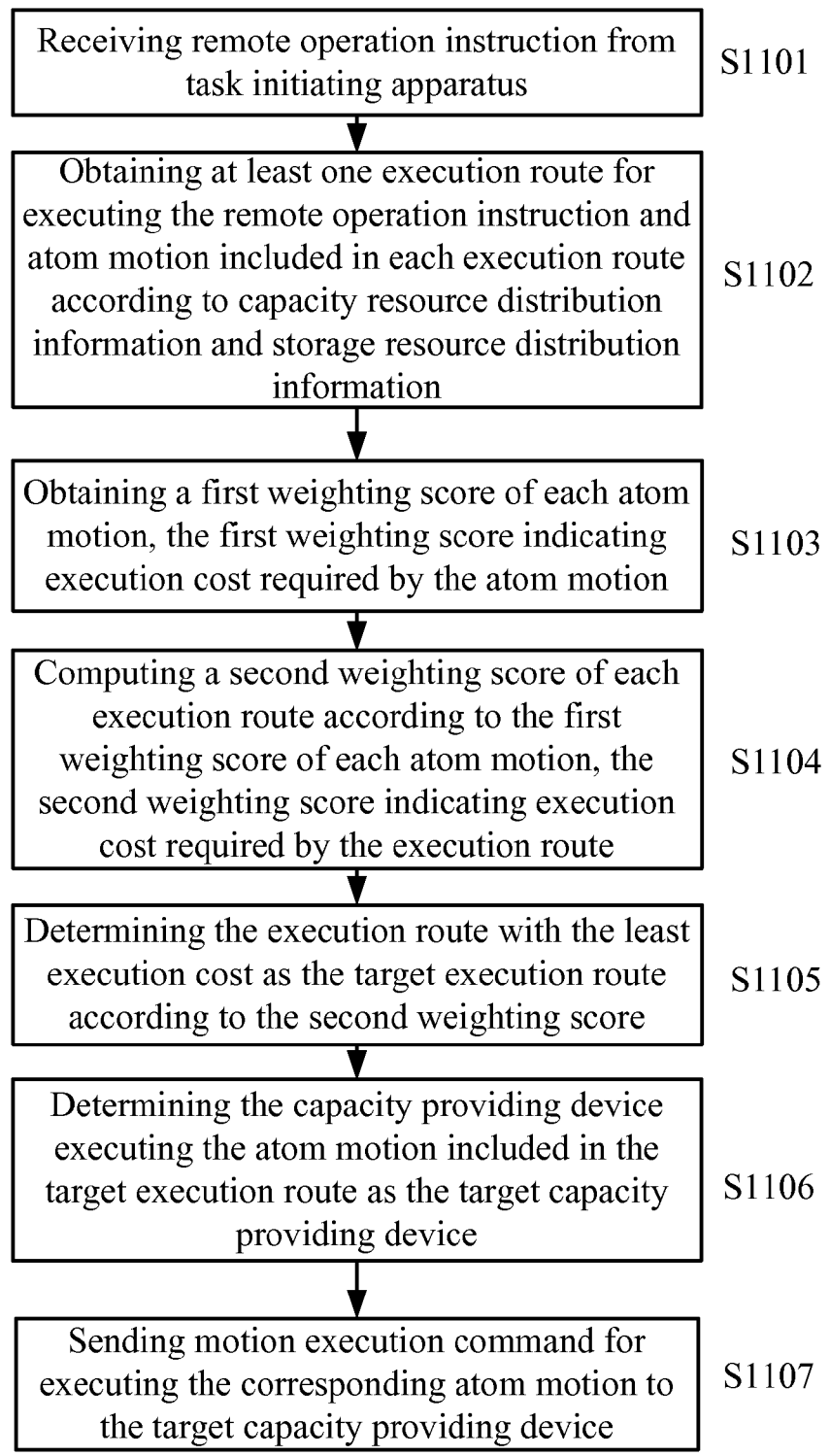
FIG. 7 is a flow chart illustrating a method for controlling resource remotely according to a fourth embodiment of the present disclosure.

FIG. 7 is a flow chart illustrating a method 1100 for controlling resource remotely according to the fourth embodiment of the present disclosure. The method 1100 for controlling resource remotely can be applied in the above-described first server. As shown in FIG. 7, in step S1101, remote operation instruction from task initiating apparatus is received. The task initiating apparatus may be the above-described information distributing apparatus or terminal apparatus such as smart phone, personal computer, personal digital assistant, portable computer, tablet computer, portable multimedia player, smart TV, or the like.

In step S1102, at least one execution route executing the remote operation instruction and atom motion included in each execution route are obtained according to the capacity resource distribution information and the storage resource distribution information, wherein the atom motion means an operation executed by one capacity providing device without being interrupted by the application program schedule mechanism. The atom motion can be an entirety. According to one example of the present disclosure, success or failure of the atom motion can be fed back to the invoking part invoking the atom motion (in this embodiment, for example, the first server). In particular, as aforementioned, each item of the capacity resource distribution information may include the capacity description information of this item of capacity resource, and each item of the storage resource distribution information may include the storage description information of this item of the storage resource. In step S1102, capacity resource providing device that can be used to execute remote operation instruction and/or storage resource required by the remote operation instruction are determined according to the capacity description information and the storage description information, and in turn at least one execution route executing the remote operation instruction is obtained.

Moreover, according to one example of the present disclosure, the capacity resource is provided by the internal device, which the information distributing apparatus has and/or the peripheral device connected to the information distributing apparatus in the first autonomy environment to which the information distributing apparatus belongs. In case that the information distributing apparatus can connect with the first server through the wide area network directly, the above-described first operation address in the capacity resource distribution information may include a first apparatus identification of the information distributing apparatus, as well as device identification of the internal device, and/or the peripheral device providing this item of capacity resource in the first autonomy environment. In addition, as aforementioned, the first apparatus identification may include user identification, identification of the first autonomy environment as well as a second apparatus identification of the distributing apparatus in the first autonomy environment to which it belongs. Moreover, the first apparatus identification can conform to wide area network protocol such as HTTP protocol and/or XMPP protocol. For example, in case that the user identification is User_ID, the identification of the first autonomy environment is LenovoDomain, the second apparatus identification of the distributing apparatus in the first autonomy environment to which it belongs is PublisherID, the first apparatus identification of the information distributing apparatus according to HTTP protocol may be "http://LenovoDomain/User_ID/{PublisherID}/", and the first apparatus identification of the information distributing apparatus according to XMPP protocol may be "User_ID@ LenovoDomain/{PublisherID}/". Further, the device identification in the first autonomy environment is Container_ID. The first operation address that can be accessed through the wide area network may be generated according to for example the wide area network protocol such as HTTP protocol and/or XMPP protocol. For example, the first operation address generated according to HTTP protocol may be "http://LenovoDomain/User_ID/{Pub lisherID}/container/{Container_ID}/", and the first operation address generated according to XMPP protocol may be "User_ID@ LenovoDomain/{PublisherID}/container/{Container_ID}/". Though the first operation address generated, according to HTTP protocol, is different from the first operation address generated, according to XMPP protocol, in format, the first operation address generated according to HTTP protocol corresponds to the first operation address generated according to XMPP protocol. The first operation address generated according to HTTP protocol and the first operation address generated according to XMPP protocol can be interconverted.

Further, the storage resource may include local data stored in the information distributing apparatus, data entry information stored in relation database of the information distributing apparatus, data stream generated in the information distributing apparatus, and/or remote end data stored in a second server that can be connected with the information distributing apparatus. The first storage address includes the first apparatus identification of the information distributing apparatus as well as storage identification of storage location of the storage resource with respect to the information distributing apparatus. Further, according to one example of the present disclosure, the storage resource may include all or part of the contents of the above items. For example, in case that the information distributing apparatus is smart phone, the data entry information stored in the relation database of the information distributing apparatus may include contact person entry stored in the address book database of the smart phone. For example, the data stream generated in the information distributing apparatus may be preview and video collection data generated by the camera of the information distributing apparatus, the real-time positioning data generated by the positioning transducer (for example, global positioning system (GPS) module) of the information distributing apparatus, and/or the real-time voice record collected by the voice recording apparatus of the information distributing apparatus, and so on. In addition, for example, the remote end data stored in the second server that can be connected with the information distributing apparatus may be data stored in the server of the wide area network such as net disk server.

For example, when one item of the storage resource is stored, the storage device in the information distributing apparatus or the second server connected with the information distributing apparatus are expressed as storage, the storage identification of the storage location of the storage resource with respect to the information distributing apparatus is Storage_Loc, i.e., storage logic of the storage resource with respect to the information distributing apparatus. Similar to the first operation address, the first storage address that can be accessed through the wide area network may be generated according to for example the wide area network protocol such as HTTP protocol and/or XMPP protocol. For example, the first storage address generated according to HTTP protocol may be "http://LenovoDomain:User_ID/{PublisherID}/storage/{Storage_Loc}/", and the first storage address generated according to XMPP protocol may be "User_ID@LenovoDomain/{PublisherID}/storage/{Storage_Loc}/". Though the first storage address generated according to HTTP protocol is different from the first storage address generated according to XMPP protocol in format, the first storage address generated according to HTTP protocol corresponds to the first storage address generated according to XMPP protocol, and the first storage address generated according to HTTP protocol and the first storage address generated according to XMPP protocol can be interconverted.

According to one example of the present disclosure, the method shown in FIG. 7 can further include receiving user identification sent by the task initiating apparatus before step S1102, in step S1102, the first server can obtain at least one execution route executing the remote operation instruction and the atom motion included in each execution route according to the capacity resource distribution information and the storage resource distribution information that match the user identification. That is, the user can only use the capacity resource and the storage resource that matches the own user identification, so as to improve the security of the method for controlling resource remotely.

In particular, as aforementioned, the user identification that can be included in the capacity resource distribution information and the storage resource distribution information received from at least one information distributing apparatus through the wide area network is stored in the first server. The user identification sent by the task initiating apparatus can be received before step S1102. For example, in step S1101, the remote operation instruction and the user identification sent simultaneously from the task initiating apparatus are received. In step S1102, the capacity resource distribution information and the storage resource distribution information that match the user identification can be obtained in the capacity resource distribution information and the storage resource distribution information according to the user identification included in the capacity resource distribution information and the storage resource distribution information. At least one execution route executing the remote operation instruction and the atom motion included in each execution route are obtained according to the capacity resource distribution information and the storage resource distribution information that match the user identification.

In step S1103, a first weighting score of each atom motion is obtained, wherein the first weighting score indicates execution cost required by the atom motion. According to one example of the present disclosure, the execution cost required by the atom motion may include time cost and/or power consumption cost or the like needed for the capacity providing device executing the atom motion. Further, according to another example of the present disclosure, in step S1103, the first weighting score of each atom motion can be obtained according to the capacity description information in the capacity resource distribution information. For example, the capacity description information includes at least resource name of this item of the apparatus capacity resource and attribute description of the apparatus providing this item of the apparatus capacity resource. The attribute description may include processing capacity, network connection bandwidth, whether belonging to portable apparatus or the like of the capacity providing device. Further, according to another example of the present disclosure, in step S1103, it can further include obtaining the first weighting score of each atom motion according to storage description information in the storage resource distribution information. For example, the description parameter of the storage resource includes one or more of operation mode, resource type, file name, distribution time, and update time of this item of the storage resource. Alternatively, the same first weighting score can be given to each atom motion.

Then, in step S1104, a second weighting score of each execution route is computed according to the first weighting score of atom motion, wherein the second weighting score indicates the execution cost required by the execution route. According to one example of the present disclosure, similar to the execution cost required by the atom motion, the execution cost required by the execution route may include the total time cost and/or total power consumption cost or the like needed for all of the capacity providing device executing the execution route.

In step S1105, the execution route with the least execution cost is determined as the target execution route according to the second weighting score. Moreover, in step S1106, the capacity providing device executing the atom motion included in the target execution route is determined as the target capacity providing device. Finally, in step S1107, motion execution command for executing the corresponding atom motion is sent to the target capacity providing device determined in step S1106.

In method for controlling resource remotely according to the present embodiments, by storing the capacity resource distribution information and the storage resource distribution information in the server in advance, the server is made to have resource profile of all of the apparatus connected thereto and the peripheral device of the apparatus, thus, the server can convert the remote operation instruction from the task initiating apparatus into a shortest route search problem of a weighting value network, so as to implement effective event assignation in distributed environment. Therefore, upon cooperation, a plurality of apparatuses do not need to use the apparatus operated currently as the center, such that the usage power consumption of the apparatus is reduced, and the usage time of the mobile apparatus is increased. Further, with the solution provided by the above-described embodiments of the present disclosure, the task initiated by the task initiating apparatus in a large scale apparatus distribution can be executed effectively even in a complicate network environment.

Further, according to another example of the present disclosure, the method shown in FIG. 7 can further include sending the atom motion included in the target execution route to the task initiating apparatus, so that the user using the task initiating apparatus can know execution mode of the remote operation instruction. Further, the method shown in FIG. 7 can further include receiving execution route of the atom motion included in the target execution route from the target capacity providing device; and sending the execution route of the atom motion included in the target execution route to the task initiating apparatus. The user using the task initiating apparatus can further know the execution schedule of the remote operation instruction.

Further, according to another example of the present disclosure, in some cases, the user may wish to change temporarily the remote execution instruction sent previously by the task initiating apparatus. At this time, the method shown in FIG. 7 can further include receiving a first motion cancel instruction from the task initiating apparatus; determining a first atom motion in the atom motion included in the target execution route according to the first motion cancel instruction; determining a first capacity providing device for executing the first atom motion in the target capacity providing device; and sending a second motion cancel instruction to the first capacity providing device, wherein the first capacity providing device cancels the execution of the first atom motion, according to the second motion cancel instruction.

Further, according to another example of the present disclosure, when the remote operation instruction is the instruction needed to obtain execution result at the task initiating apparatus ultimately such as downloading file, the method shown in FIG. 7 can further include: receiving the execution result from the capacity providing device completing the last one atom motion in the execution route after completing the execution in the target execution route; and sending the execution result to the task initiating apparatus. In particular, after completing the execution of the target execution route, the first server can receive the execution result from the information distributing apparatus including the capacity providing device completing the last one atom motion in the execution route or the information distributing apparatus connected to this capacity providing device.

Figure 8:
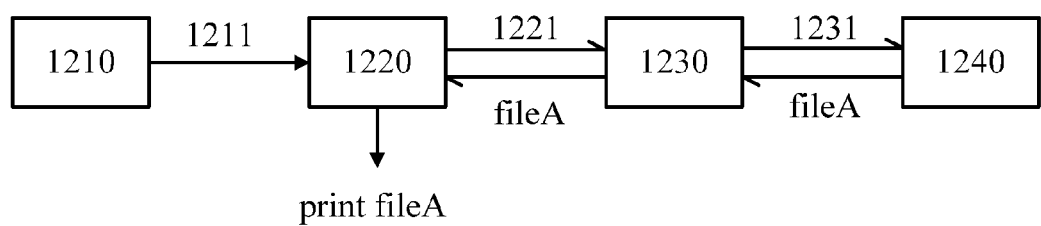
FIG. 8 is an explanatory diagram illustrating an example situation for carrying out remote control according to the conventional multiple apparatus cooperation scheme.

Hereinafter, one example of carrying out remote resource control by using the method for controlling resource remotely shown in FIG. 7 is described with reference to FIG. 8 to FIG. 10. FIG. 8 is an exemplary diagram illustrating an example situation for carrying out remote control according to the conventional multiple apparatus cooperation scheme.

As shown in FIG. 8, when the task initiating apparatus 1210 wishes to control the terminal apparatus 1220 to print file A under the cloud end picture directory of the terminal apparatus 1230, the task initiating apparatus 1210 sends instruction 1211 for printing the file A stored in server 1240 by the terminal apparatus 1230 to the terminal apparatus 1220. The terminal apparatus 1220 sends a first data acquisition instruction 1221 to the terminal apparatus 1230 to acquire the file A under the cloud end picture directory. In case that the file A under the cloud end picture directory is the file stored in the server 1240 by the terminal apparatus 1230, the terminal apparatus 1230 sends a second data acquisition instruction 1231 to the server 1240 according to the first data acquisition instruction 1221. The server 1240 sends the file A to the terminal apparatus 1230 according to the second data acquisition instruction 1231, and the terminal apparatus 1230 forwards the file A to the terminal apparatus 1220 after receiving the file A from the server 1240. Finally, the terminal apparatus 1220 prints the file A. In the example shown in FIG. 8, since the capacity resource and the storage resource of other apparatus are not known between the plurality of apparatuses co-operating with one another, even in case that the terminal apparatus 1220 can be connected to the server 1240, the file A still needs to be forwarded to the terminal apparatus 1230 from the server 1240, and then sent to the terminal apparatus 1220 from the terminal apparatus 1230, that is, the file A needs to be transferred multiple times. Further, in case that the terminal apparatus 1230 is a portable mobile apparatus, downloading and forwarding the file A increases the power consumption of the terminal apparatus 1230, reduces the stand-by time of the terminal apparatus 1230.

Figure 9:
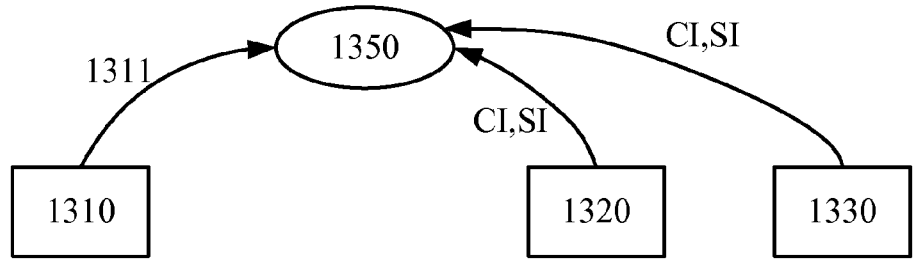
FIG. 9 is an explanatory diagram illustrating an example situation for carrying out remote resource control according to the method for controlling resource remotely shown in FIG. 7.

FIG. 9 is an exemplary diagram illustrating an example situation for carrying out remote resource control according to the method for controlling resource remotely shown in FIG. 7. In the example as shown in FIG. 9, the capacity resource distribution information CI and the storage resource distribution information SI received from the information distributing apparatus 1320 and 1330 through the wide area network are stored in the first server 1350. Each item of the capacity resource distribution information includes the first operation address of the capacity providing device providing this item of capacity resource that can be accessed by the wide area network, as well as the capacity description information of this item of capacity resource. Each item of the storage resource distribution information includes the first storage address of this item of the storage resource that can be accessed through the wide area network as well as the storage description information of this item of the storage resource.

As shown in FIG. 9, when the task initiating apparatus 1310 wishes to control the information distributing apparatus 1320 to print file A under Picasa directory of the information distributing apparatus 1330, according to step S1101 of the method for controlling resource remotely shown in FIG. 7, the first server 1350 receives remote operation instruction 1311 from the task initiating apparatus 1310. Then according to step S1102, at least one execution route executing the remote operation instruction and atom motion included in each execution route are obtained according to the capacity resource distribution information and the storage resource distribution information.

Figure 10:
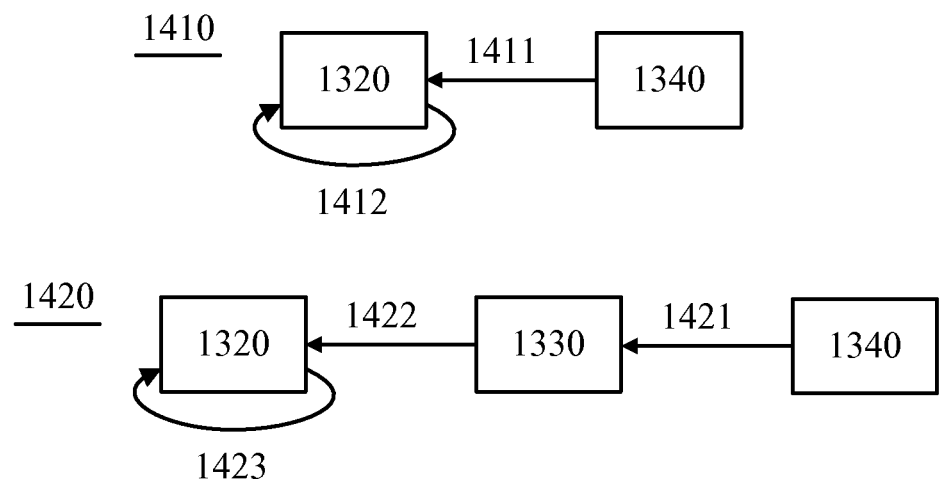
FIG. 10 is a schematic diagram illustrating an execution route for executing remote operation instruction obtained according to capacity resource distribution information and storage resource distribution information in the example situation shown in FIG. 9.

FIG. 10 is a schematic diagram illustrating obtaining an execution route for executing remote operation instruction according to capacity resource distribution information and storage resource distribution information in the example situation shown in FIG. 9. When the capacity resource distribution information stored in the first server 1350 indicates that both of the information distributing apparatus 1320 and the information distributing apparatus 1330 include network connection capacity providing device providing network connection that is capable of being connected to the wide area network, and in case that storage resource distribution information stored in the first server 1350 indicates that the file A under Picasa directory of the information distributing apparatus 1330 is a document stored in a second server 1340, as shown in FIG. 10, a first execution route 1410 and a second execution route 1420 can be obtained. There includes a first atom motion 1411 and a second atom motion 1412 in the first execution route 1410. The information distributing apparatus 1320 downloads the file A from the second server 1340 through the network connection capacity providing device thereof in the first atom motion 1411. The information distributing apparatus 1320 print the downloaded file A in the second atom motion 1412. There includes third atom motion 1421 to fifth atom motion 1423 in the second execution route 1420. In the third atom motion 1421, the information distributing apparatus 1330 downloads the file A from the second server 1340 through the network connection capacity providing device thereof. In the fourth atom motion 1422, the information distributing apparatus 1330 sends the file A to the information distributing apparatus 1320 through the network connection capacity providing device thereof. In the fifth atom motion 1423, the information distributing apparatus 1320 prints the received file A.

Then according to step S1103, a first weighting score of the first to the fifth atom motion is obtained, wherein the first weighting score indicates the execution cost required by the atom motions. According to one example of the present disclosure, the first weighting score of the first to the fifth atom motions can be obtained according to the capacity description information in the capacity resource distribution information. For example, the capacity description information may include capacity parameter such as network connection band width, processing capacity, whether it is portable electronic apparatus or the like, the weighting coefficient can be set for each capacity parameter, so that the first weighting scores of each atom motion are obtained according to the weighting coefficient and the capacity parameter. For example, when the capacity resource distribution information stored in the first server 1350 indicates the connection bandwidth of the network connection capacity providing device in the information distributing apparatus 1320 is less than the connection bandwidth of the network connection capacity providing device in the information distributing apparatus 1330, the first weighting score of the first atom motion 1411 can be higher than the first weighting score of the third atom motion 1421 to indicate that the execution cost (for example, execution time cost) required by the first atom motion 1411 is higher than the execution cost (for example, execution time cost) required by the third atom motion 1421.

Then, the second weighting score of each execution route is computed according to the first weighting score of each atom motion, wherein the second weighting score indicates the execution cost required by the execution route. According to step S1105, the execution route with the least execution cost is determined as the target execution route according to the second weighting score. It is assumed that the first weighting score of the first to the fifth atom motion are identical. In this case, the second weighting score of the first execution route 1410 is lower than the second weighting score of the second execution route 1420, to indicate that the execution cost required by the first execution route 1410 is lower than the execution cost required by the second execution route 1420. The first execution route 410 can be determined as the target execution route according to step S1105.

The capacity providing device executing the first atom motion and the second atom motion included in the first execution route 1410 can be determined as the target capacity providing device according to step S1106. Finally, according to step S1107, motion execution command for executing the corresponding atom motion is sent to the target capacity providing device determined in step S1106. In the example of carrying out remote resource control according to the method for controlling resource remotely shown in FIG. 7 shown in FIG. 9, the remote control instruction similar to that of the situation shown in FIG. 8 can be implemented by using only one terminal apparatus as the information distributing apparatus, so that it does not need to use one operating apparatus as center when a plurality of apparatuses co-operate, and the execution cost of the control instruction is saved.

Figure 11:
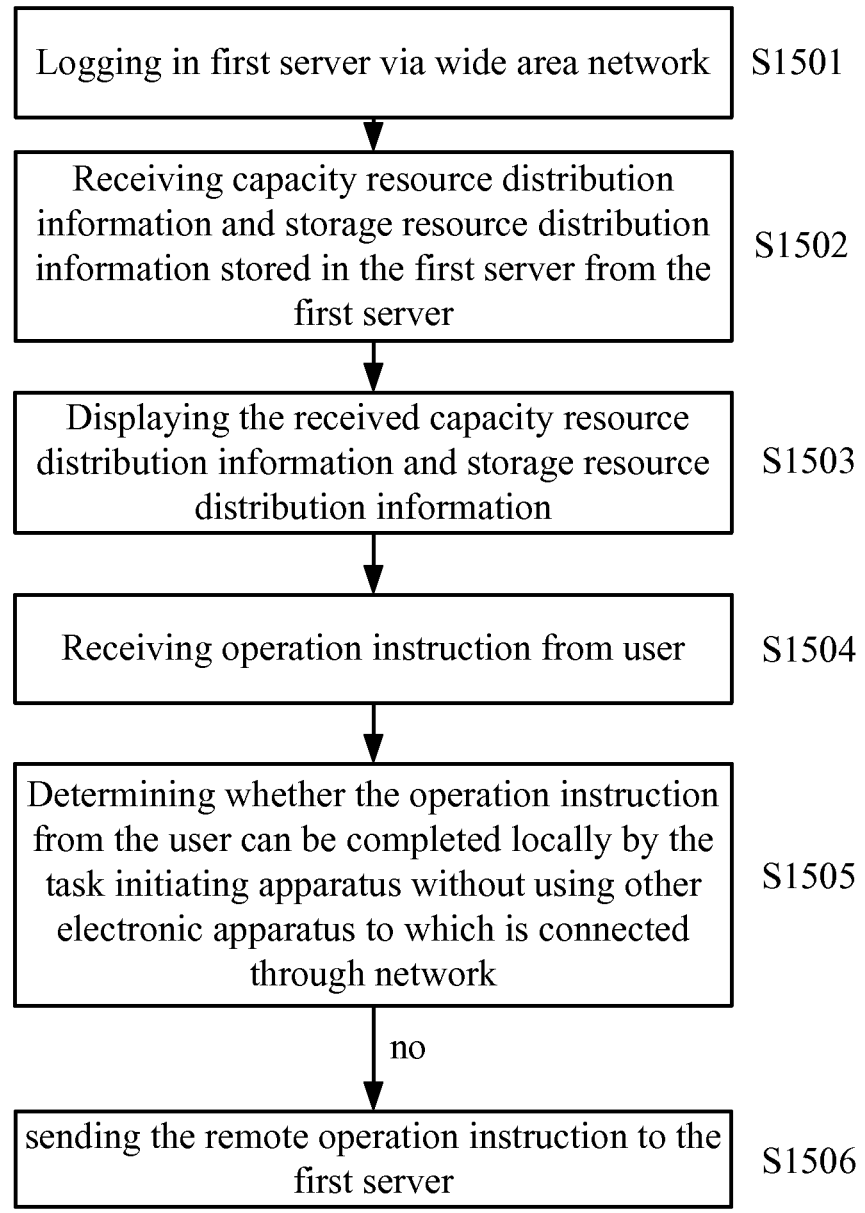
FIG. 11 is a flow chart illustrating a method for controlling resource remotely according to a fifth embodiment of the present disclosure.

FIG. 11 is a flow chart illustrating a method 1500 for controlling resource remotely according to the fifth embodiment of the present disclosure. The method 1500 for controlling resource remotely can be applied in the above-described task initiating apparatus. As show in FIG. 11, in step S1501, the first server is logged in via the wide area network. In step S1502, the capacity resource distribution information and the storage resource distribution information stored in the first server are received from the first server, wherein each item of the capacity resource distribution information includes the first operation address of the capacity providing device providing this item of capacity resource that can be accessed through the wide area network as well as the capacity description information of this item of capacity resource, and each item of the storage resource distribution information includes the first storage address of this item of the storage resource that can be accessed through the wide area network as well as the storage description information of this item of the storage resource. The first server in this embodiment is similar to the above-described first server. The first server, the capacity resource distribution information, and the storage resource distribution information stored in the first server are described in detail in combination with FIG. 7, so it is no longer described here. Then, in step S1503, the capacity resource distribution information and the storage resource distribution information received are displayed.

According to one example of the present disclosure, in step S1501, the first server can be logged in via the wide area network by the user identification. In step S1502, the capacity resource distribution information and the storage resource distribution information stored in the first server that matches the user identification are received from the first server. That is, the task initiating apparatus can only receive the capacity resource and the storage resource that matches the user identification sent by itself, so as to improve the security of the method for controlling resource remotely.

Further, according to one example of the present disclosure, in step S1503, the capacity resource corresponding to the received capacity resource distribution information is displayed as the capacity resource that the task initiating apparatus has (for example, as device included in the task initiating apparatus), and similarly, the storage resource corresponding to the received storage resource distribution information is displayed as the storage resource that the task initiating apparatus has (for example, as data stored in the task initiating apparatus). Alternatively, the capacity resource corresponding to the capacity resource distribution information received from the first server can be displayed as remote capability resource different from the capacity resource that the task initiating apparatus has, and similarly, the storage resource corresponding to the storage resource distribution information received from the first server can be displayed as remote storage resource different from the storage resource that the task initiating apparatus has.

In step S1504, operation instruction is received from the user. Then, in step S1505, whether the operation instruction from the user received in step S1504 is remote operation instruction is determined, that is, in step S505, whether the operation instruction from the user received in step S1504 can be completed locally by the task initiating apparatus instead of needing to use other electronic apparatus connected through network is determined.

When the operation instruction is the remote operation instruction, in step S1506, the remote operation instruction is sent to the first server. Wherein the first server obtains the target execution route executing the remote operation instruction and the atom motion included in the target execution route according to the capacity resource distribution information and the storage resource distribution information, determines the capacity providing device executing the atom motion included in the target execution route as the target capacity providing device, and sends motion execution command for executing the corresponding atom motion to the target capacity providing device, the atom motion is an operation executed by one capacity providing device without being interrupted by application program schedule mechanism. The atom motion can be an entirety. According to one example of the present disclosure, success or failure of the atom motion can be fed back to the invoking part invoking the atom motion (in this embodiment, for example, the first server). The operation carried out by the first server according to the remote operation instruction is described in detail in combination with FIG. 7, so it is no longer described here.

In the method for controlling resource remotely according to the present embodiment, the task initiating apparatus receives the capacity resource distribution information and the storage resource distribution information stored in the first server in advance from the first server, so that the user can know the capacity resource and the storage resource in the information distributing apparatus connected to the server and/or the terminal apparatus connected to the information distributing apparatus, so as to facilitate the user to carry out the remote control operation.

Further, in this embodiment, the task initiating apparatus send the remote operation instruction to the server storing the capacity resource distribution information and the storage resource distribution information in advance, since the capacity resource distribution information and the storage resource distribution information are stored in the server in advance, the server has resource profile of all of the apparatus connected thereto and the peripheral device of the apparatus, thus, the server can convert the remote operation instruction from the task initiating apparatus into a shortest route search problem of a weighting value network, so as to implement effective event assignation in distributed environment. Therefore, upon cooperation, a plurality of apparatuses do not need to use the apparatus operated currently as the center, so that the usage power consumption of the apparatus is reduced, and the usage time of the mobile apparatus is increased.

Further, according to another example of the present disclosure, when the remote operation instruction is instruction needs to obtain execution result at the task initiating apparatus ultimately such as downloading file, the method shown in FIG. 11 can further include receiving the execution result after completing the execution of the target execution route. For example, after completing the execution of the target execution route, the task initiating apparatus can receive the execution result from the capacity providing device completing the last one atom motion in the execution route. Alternatively, after completing the execution of the target execution route, the capacity providing device completing the last one atom motion in the execution route can send the execution result to the task initiating apparatus via the first server.

Further, according to another example of the present disclosure, the method shown in FIG. 11 can further include receiving atom motion included in the target execution route and the execution route of the atom motion included in the target execution route from the first server. The user using the task initiating apparatus is made to know the execution mode of the remote operation instruction and the execution schedule of the remote operation instruction.

Further, according to another example of the present disclosure, in some cases, the user may wish to change temporarily the remote execution instruction sent previously by the task initiating apparatus. At this time, the method shown in FIG. 11 can further include determining the first atom motion in the atom motion included in the target execution route according to a cancel input of the user; generating a first motion cancel instruction indicating cancel of the first atom motion; and sending the first motion cancel instruction to the first server, wherein the first server can determine the first atom motion in the atom motion included in the target execution route according to the first motion cancel instruction and determine a first capacity providing device for executing the first atom motion in the target capacity providing device, and send a second motion cancel instruction to the first capacity providing device, wherein the first capacity providing device cancels the execution of the first atom motion according to the second motion cancel instruction.

Figure 12:
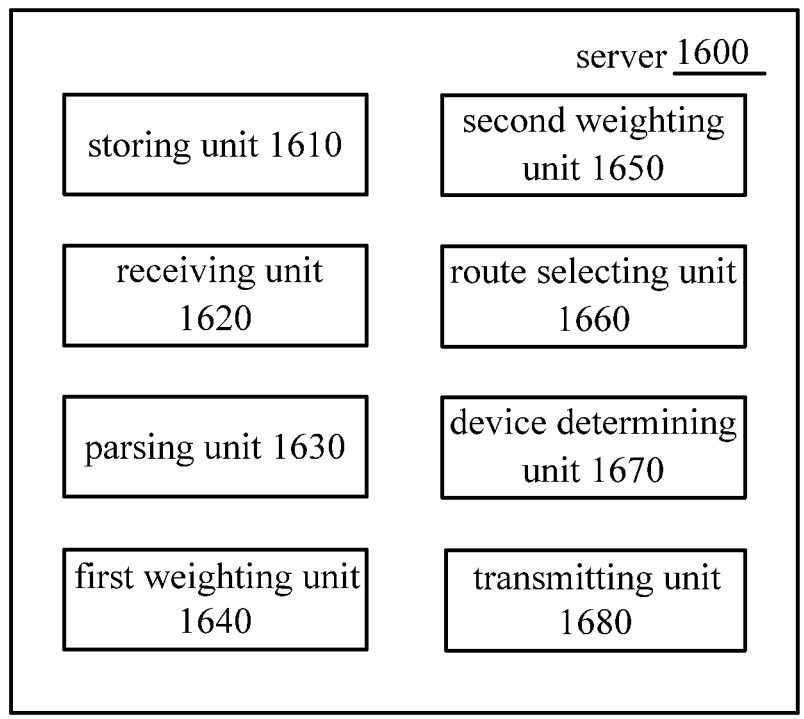
FIG. 12 is a schematic structural block diagram of the server according to the fourth embodiment of the present disclosure.

Hereinafter, the server of the fourth embodiment of the present disclosure is explained with reference to FIG. 12. FIG. 12 is a schematic structural block diagram of the server 1600 according to the fourth embodiment of the present disclosure. As shown in FIG. 12, the server 1600 of the embodiment includes a storing unit 1610, a receiving unit 1620, a parsing unit 1630, a first weighting unit 1640, a second weighting unit 1650, a route selecting unit 1660, a device determining unit 1670 and a transmitting unit 1680. The respective units of the server 1600 execute the above-described respective steps/functions of the method for controlling resource remotely of FIG. 7, therefore, it will no longer be described for the sake of simplicity.

For example, the storing unit 1610 can store the capacity resource distribution information and the storage resource distribution information received from at least one information distributing apparatus through the wide area network, wherein each item of the capacity resource distribution information includes the first operation address of the capacity providing device providing this item of capacity resource that can be accessed through the wide area network as well as the capacity description information of this item of capacity resource, and each item of the storage resource distribution information includes the first storage address of this item of the storage resource that can be accessed through the wide area network as well as the storage description information of this item of the storage resource.

The receiving unit 1620 can receive the remote operation instruction from the task initiating apparatus. The task initiating apparatus may be the above-described information distributing apparatus or terminal apparatus such as smart phone, personal computer, personal digital assistant, portable computer, tablet computer, portable multimedia player, smart TV, or the like.

The parsing unit 1630 can obtain at least one execution route executing the remote operation instruction and atom motion included in each execution route according to the capacity resource distribution information and the storage resource distribution information, wherein the atom motion is an operation executed by one capacity providing device without being interrupted by the application program schedule mechanism. The atom motion can be an entirety. According to one example of the present disclosure, success or failure of the atom motion can be fed back to the invoking part invoking the atom motion (in this embodiment, for example, the first server). In particular, as aforementioned, each item of the capacity resource distribution information may include the capacity description information of this item of capacity resource, and each item of the storage resource distribution information may include the storage description information of this item of the storage resource. The parsing unit 1630 can determine the capacity resource providing device that can be used to execute remote operation instruction and/or storage resource required by the remote operation instruction according to the capacity description information and the storage description information, and in turn obtain at least one execution route executing the remote operation instruction.

In addition, according to one example of the present disclosure, the capacity resource is provided by internal device, which the information distributing apparatus has, and/or the peripheral device connected to the information distributing apparatus in the first autonomy environment to which the information distributing apparatus belongs. In case that the information distributing apparatus can connect with the first server through the wide area network directly, the above-described first operation address in the capacity resource distribution information may include a first apparatus identification of the information distributing apparatus, as well as device identification of the internal device and/or the peripheral device providing this item of capacity resource in the first autonomy environment. As aforementioned, the first apparatus identification may include user identification, an identification of the first autonomy environment as well as a second apparatus identification of the distributing apparatus in the first autonomy environment to which it belongs. The first apparatus identification can conform to wide area network protocol such as HTTP protocol and/or XMPP protocol. For example, in case that the user identification is User_ID, the identification of the first autonomy environment is LenovoDomain, the second apparatus identification of the distributing apparatus in the first autonomy environment to which it belongs is PublisherID, the first apparatus identification of the information distributing apparatus according to HTTP protocol may be "http://LenovoDomain/User_ID/{PublisherID}/", and the first apparatus identification of the information distributing apparatus according to XMPP protocol may be "User_ID@LenovoDomain/{PublisherID}/". Further, the device identification in the first autonomy environment is Container_ID. The first operation address that can be accessed through the wide area network may be generated according to for example the wide area network protocol such as HTTP protocol and/or XMPP protocol. For example, the first operation address generated according to HTTP protocol may be "http://LenovoDomain/User_ID/{PublisherID}/container/{Container_ID}/", and the first operation address generated according to XMPP protocol may be "User_ID@LenovoDomain/{PublisherID}/container/{Container_ID}/". Though the first operation address generated according to HTTP protocol is different from the first operation address generated according to XMPP protocol in format, the first operation address generated according to HTTP protocol corresponds to the first operation address generated according to XMPP protocol, and the first operation address generated according to HTTP protocol and the first operation address generated according to XMPP protocol can be interconverted.

Further, the storage resource may include local data stored in the information distributing apparatus, data entry information stored in relation database of the information distributing apparatus, data stream generated in the information distributing apparatus, and/or remote end data stored in a second server that can be connected with the information distributing apparatus. The first storage address includes the first apparatus identification of the information distributing apparatus as well as storage identification of storage location of the storage resource with respect to the information distributing apparatus. Further, according to one example of the present disclosure, the storage resource may include all or part of the contents of the above items. For example, in case that the information distributing apparatus is smart phone, the data entry information stored in the relation database of the information distributing apparatus may include contact person entry stored in the address book database of the smart phone. For example, the data stream generated in the information distributing apparatus may be preview and video collection data generated by the camera of the information distributing apparatus, the real-time positioning data generated by the positioning transducer (for example, global positioning system (GPS) module) of the information distributing apparatus, and/or the real-time voice record collected by the voice recording apparatus of the information distributing apparatus, and so on. For example, the remote end data stored in the second server that can be connected with the information distributing apparatus may be data stored in the server of the wide area network such as net disk server.

For example, the storage device storing one item of the storage resource in the information distributing apparatus or the second server connected with the information distributing apparatus as the storage device are expressed as storage, the storage identification of the storage location of the storage resource with respect to the information distributing apparatus is Storage_Loc, i.e., storage logic of the storage resource with respect to the information distributing apparatus. Similar to the first operation address, the first storage address that can be accessed through the wide area network may be generated according to for example the wide area network protocol such as HTTP protocol and/or XMPP protocol. For example, the first storage address generated according to HTTP protocol may be "http://LenovoDomain:User_ID/{PublisherID}/storage/{Storage_Loc}/", and the first storage address generated according to XMPP protocol may be "User_ID@ LenovoDomain/{PublisherID}/storage/{Storage_Loc}/". Though the first storage address generated according to HTTP protocol is different from the first storage address generated according to XMPP protocol in format, the first storage address generated according to HTTP protocol corresponds to the first storage address generated according to XMPP protocol, and the first storage address generated according to HTTP protocol and the first storage address generated according to XMPP protocol can be interconverted.

According to one example of the present disclosure, the method shown in FIG. 7 can further include receiving user identification sent by the task initiating apparatus before step S1102, in step S1102, the first server can obtain at least one execution route executing the remote operation instruction and the atom motion included in each execution route according to the capacity resource distribution information and the storage resource distribution information that match the user identification. That is, the user can only use the capacity resource and the storage resource that matches the own user identification, so as to improve the security of the method for controlling resource remotely.

In particular, as aforementioned, the user identification can be included in the capacity resource distribution information and the storage resource distribution information received from at least one information distributing apparatus through the wide area network stored in the first server. The receiving unit 1620 can further receive the user identification sent by the task initiating apparatus. For example, the receiving unit 1620 receives the remote operation instruction and the user identification sent simultaneously by the task initiating apparatus. The parsing unit 1630 can obtain the capacity resource distribution information and the storage resource distribution information that match the user identification in the capacity resource distribution information and the storage resource distribution information according to the user identification included in the capacity resource distribution information and the storage resource distribution information, and then obtain at least one execution route executing the remote operation instruction and the atom motion included in each execution route according to the capacity resource distribution information and the storage resource distribution information that match the user identification.

The first weighting unit 1640 can obtain a first weighting score of each atom motion, wherein the first weighting score indicates the execution cost required by the atom motion. According to one example of the present disclosure, the execution cost required by the atom motion may include time cost and/or power consumption cost or the like needed for the capacity providing device executing the atom motion. Further, according to another example of the present disclosure, the first weighting unit 1640 can obtain the first weighting score of each atom motion according to the capacity description information in the capacity resource distribution information. For example, the capacity description information includes at least resource name of this item of the apparatus capacity resource and attribute description of the apparatus providing this item of the apparatus capacity resource. The attribute description may include processing capacity, network connection bandwidth, whether belonging to portable apparatus or the like of the capacity providing device. Further, according to another example of the present disclosure, the first weighting unit 1640 can further obtain the first weighting score of each atom motion according to storage description information in the storage resource distribution information. For example, the description parameter of the storage resource includes one or more of operation mode, resource type, file name, distribution time, and update time of this item of the storage resource. Alternatively, the same first weighting score can be given to each atom motion.

Then, the second weighting unit 1650 computes the second weighting score of each execution route according to the first weighting score of each atom motion, wherein the second weighting score indicates the execution cost required by the execution route. According to one example of the present disclosure, similar to the execution cost required by the atom motion, the execution cost required by the execution route may include the total time cost and/or total power consumption cost or the like needed for all of the capacity providing device executing the execution route.

The route selecting unit 1660 can determine the execution route with the least execution cost as the target execution route according to the second weighting score. The device determining unit 1670 determines the capacity providing device executing the atom motion included in the target execution route as the target capacity providing device. Finally, the transmitting unit 1680 sends motion execution command for executing the corresponding atom motion to the target capacity providing device determined by the device determining unit 1670.

In this embodiment, by storing the capacity resource distribution information and the storage resource distribution information in the server in advance, the server is made to have resource profile of all of the apparatus connected thereto and the peripheral device of the apparatus, thus, the server can convert the remote operation instruction from the task initiating apparatus into a shortest route search problem of a weighting value network, so as to implement effective event assignation in distributed environment. Therefore, upon cooperation, a plurality of apparatuses do not need to use the apparatus operated currently as the center, so that the usage power consumption of the apparatus is reduced, and the usage time of the mobile apparatus is increased. Further, with the solution provided by the above-described embodiments of the present disclosure, the task initiated by the task initiating apparatus in a large scale apparatus distribution can be executed effectively even in a complicate network environment.

Further, according to another example of the present disclosure, the transmitting unit 1680 can further send the atom motion included in the target execution route to the task initiating apparatus, so that the user using the task initiating apparatus can know the execution mode of the remote operation instruction. The receiving unit 1620 can further receive the execution route of the atom motion included in the target execution route from the target capacity providing device. The transmitting unit 1680 can further send the execution route of the atom motion included in the target execution route to the task initiating apparatus, so that the user using the task initiating apparatus can further know the execution schedule of the remote operation instruction.

Further, according to another example of the present disclosure, in some cases, the user may wish to temporarily change the remote execution instruction sent previously by the task initiating apparatus, at this time, the receiving unit 1620 can further receive a first motion cancel instruction from the task initiating apparatus. The route selecting unit 1660 can further determine a first atom motion in the atom motion included in the target execution route according to the first motion cancel instruction. And the device determine unit 1670 can further determine a first capacity providing device for executing the first atom motion in the target capacity providing device. The transmitting unit 1680 can further send a second motion cancel instruction to the first capacity providing device, wherein the first capacity providing device cancels the execution of the first atom motion according to the second motion cancel instruction.

Further, according to another example of the present disclosure, when the remote operation instruction is the instruction needed to obtain execution result at the task initiating apparatus ultimately such as downloading file, the receiving unit 1620 can further receive the execution result from the capacity providing device completing the last one atom motion in the execution route after completing the execution in the target execution route, and the transmitting unit 1680 can send the execution result to the task initiating apparatus. In particular, after completing the execution of the target execution route, the receiving unit 1620 can receive the execution result from the information distributing apparatus including the capacity providing device completing the last one atom motion in the execution route or the information distributing apparatus connected to this capacity providing device.

Figure 13:
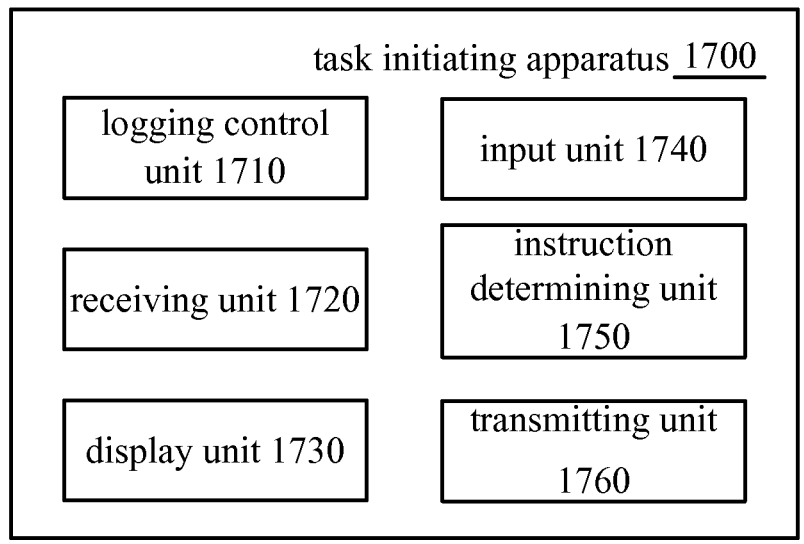
FIG. 13 is a schematic structural block diagram of a task initiating apparatus according to the fifth embodiment of the present disclosure.

Hereinafter, the task initiating apparatus of the fifth embodiment of the present disclosure is explained with reference to FIG. 13. FIG. 13 is a schematic structural block diagram of the task initiating apparatus 1700 according to the fifth embodiment of the present disclosure. As shown in FIG. 13, the task initiating apparatus 1700 of the embodiment includes a logging control unit 1710, a receiving unit 1720, a display unit 1730, an input unit 1740, an instruction determining unit 1750 and a transmitting unit 1760. The respective units of the task initiating apparatus 1700 execute the above-described respective steps/functions of the method for controlling resource remotely of FIG. 11, therefore, it will no longer be described for the sake of simplicity.

For example, the logging control unit 1710 can log in the first server via the wide area network. The receiving unit 1720 receives the capacity resource distribution information and the storage resource distribution information stored in the first server from the first server, wherein each item of the capacity resource distribution information includes the first operation address of the capacity providing device providing this item of capacity resource that can be accessed through the wide area network as well as the capacity description information of this item of capacity resource, and each item of the storage resource distribution information includes the first storage address of this item of the storage resource that can be accessed through the wide area network as well as the storage description information of this item of the storage resource. The first server in this embodiment is similar to the above-described first server. The first server, the capacity resource distribution information, and the storage resource distribution information stored in the first server are described in detail in combination with FIG. 7, so it is no longer described here. Then, the display unit 1730 displays the capacity resource distribution information and the storage resource distribution information received.

According to one example of the present disclosure, the logging control unit 1710 can log in the first server via the wide area network by the user identification. The receiving unit 1720 can receive the capacity resource distribution information and the storage resource distribution information stored in the first server that match the user identification from the first server. That is, the task initiating apparatus can only receive the capacity resource and the storage resource that matches the user identification sent by itself, so as to improve the security of the method for controlling resource remotely.

Further, according to one example of the present disclosure, the display unit 1730 displays the capacity resource corresponding to the received capacity resource distribution information as the capacity resource that the task initiating apparatus has (for example, as device included in the task initiating apparatus), and similarly, displays the storage resource corresponding to the received storage resource distribution information as the storage resource that the task initiating apparatus has (for example, as data stored in the task initiating apparatus). Alternatively, the display unit 1730 can also display the capacity resource corresponding to the capacity resource distribution information received from the first server as remote capability resource different from the capacity resource that the task initiating apparatus has. Similarly, displays the storage resource corresponding to the storage resource distribution information received from the first server as remote storage resource different from the storage resource that the task initiating apparatus has.

For example, the capacity resource distribution information may be the identification and/or description information of the capacity resource corresponding to the capacity resource distribution information of the information distributing apparatus. Similarly, the storage resource distribution information may be the identification and/or description information of the storage resource corresponding to the storage resource distribution information of the information distributing apparatus.

The input unit 1740 can receive operation instruction from the user. Then, the instruction determining unit 1750 determines that whether the operation instruction from the user received by the input unit 1740 is remote operation instruction. That is, the instruction determining unit 1750 determines that whether the operation instruction from the user received by the input unit 1740 can be completed locally by the task initiating apparatus instead of needing to use other electronic apparatus connected through the network.

When the operation instruction is the remote operation instruction, the transmitting unit 1760 sends the remote operation instruction to the first server. Wherein the first server obtains the target execution route executing the remote operation instruction and the atom motion included in the target execution route according to the capacity resource distribution information and the storage resource distribution information, determines the capacity providing device executing the atom motion included in the target execution route as the target capacity providing device, and sends motion execution command for executing the corresponding atom motion to the target capacity providing device, the atom motion is an operation executed by one capacity providing device without being interrupted by application program schedule mechanism. The atom motion can be an entirety. According to one example of the present disclosure, success or failure of the atom motion can be fed back to the invoking part invoking the atom motion (in this embodiment, for example, the first server). The operation carried out by the first server according to the remote operation instruction is described in detail in combination with FIG. 7, so it is no longer described here.

In the task initiating apparatus according to the present embodiment, the task initiating apparatus receives the capacity resource distribution information and the storage resource distribution information stored in the first server in advance from the first server. The user can know the capacity resource and the storage resource in the information distributing apparatus connected to the server and/or the terminal apparatus connected to the information distributing apparatus, to facilitate the user to carry out the remote control operation.

Further, in this embodiment, the task initiating apparatus sends the remote operation instruction to the server storing the capacity resource distribution information and the storage resource distribution information in advance, since the capacity resource distribution information and the storage resource distribution information are stored in the server in advance, the server have resource profile of all of the apparatus connected thereto and the peripheral device of the apparatus, thus, the server can convert the remote operation instruction from the task initiating apparatus into a shortest route search problem of a weighting value network, so as to implement effective event assignation in distributed environment. Therefore, upon cooperation, a plurality of apparatuses do not need to use the apparatus operated currently as the center, so that the usage power consumption of the apparatus is reduced, and the usage time of the mobile apparatus is increased.

Further, according to another example of the present disclosure, when the remote operation instruction is instruction needs to obtain execution result at the task initiating apparatus ultimately such as downloading file, the method shown in FIG. 11 can further include receiving the execution result after completing the execution of the target execution route. For example, after completing the execution of the target execution route, the task initiating apparatus can receive the execution result from the capacity providing device completing the last one atom motion in the execution route. Alternatively, after completing the execution of the target execution route, the capacity providing device completing the last one atom motion in the execution route can send the execution result to the task initiating apparatus via the first server.

Further, according to another example of the present disclosure, the receiving unit 1720 can further receive atom motion included in the target execution route and the execution route of the atom motion included in the target execution route from the first server. The user using the task initiating apparatus is made to know the execution mode of the remote operation instruction and the execution schedule of the remote operation instruction.

Further, according to another example of the present disclosure, in some cases, the user may wish to change temporarily the remote execution instruction sent previously by the task initiating apparatus. At this time, the input unit 1720 can determine the first atom motion in the atom motion included in the target execution route according to the cancel input of the user. The task initiating apparatus 1700 can further include an instruction generating unit. The instruction generating unit can generate a first motion cancel instruction indicating cancel of the first atom motion. The transmitting unit 1760 can further send the first motion cancel instruction to the first server, wherein the first server can determine the first atom motion in the atom motion included in the target execution route, according to the first motion cancel instruction, and determine the first capacity providing device for executing the first atom motion in the target capacity providing device, and send a second motion cancel instruction to the first capacity providing device, wherein the first capacity providing device cancels the execution of the first atom motion according to the second motion cancel instruction.

Further, according to another embodiment of the present disclosure, the task initiating apparatus may include a display unit, an input unit, and a transmitting unit. In particular, the display unit can display the capacity resource distribution information and the storage resource distribution information of the information distributing apparatus that the task initiating apparatus can access. For example, the task initiating apparatus can receive the capacity resource distribution information and the storage resource distribution information of the information distributing apparatus stored in the first server from the first server. Both of the task initiating apparatus and the information distributing apparatus can be connected to the wide area network. Alternatively, the capacity resource distribution information and the storage resource distribution information of the information distributing apparatus can be stored in the task initiating apparatus in advance.

For example, the capacity resource distribution information may be the identification and/or description information of the capacity resource corresponding to the capacity resource distribution information of the information distributing apparatus. Similarly, the storage resource distribution information may be the identification and/or description information of the storage resource corresponding to the storage resource distribution information of the information distributing apparatus.

Further, the display unit can display the capacity resource corresponding to the capacity resource distribution information of the information distributing apparatus as the capacity resource that the task initiating apparatus itself has. Similarly, display the storage resource corresponding to the storage resource distribution information of the information distributing apparatus as the storage resource that the task initiating apparatus itself has. Alternatively, the display unit can also display the capacity resource corresponding to the capacity resource distribution information of the information distributing apparatus as remote capability resource different from the capacity resource that the task initiating apparatus itself has. Similarly, displays the storage resource corresponding to the storage resource distribution information of the information distributing apparatus as remote storage resource different from the storage resource that the task initiating apparatus itself has.

The input unit can receive resource operation instruction of target resource in the capacity resource indicated by the capacity resource distribution information and the storage resource indicated by the storage resource distribution information from the user; the transmitting unit can send the resource operation instruction to the first server. The first server can store the capacity resource distribution information and the storage resource distribution information received from at least one information distributing apparatus through the wide area network in advance, wherein each item of the capacity resource distribution information includes the first operation address of the capacity providing device providing this item of capacity resource that can be accessed through the wide area network as well as the capacity description information of this item of capacity resource, and each item of the storage resource distribution information includes the first storage address of this item of the storage resource that can be accessed through the wide area network as well as the storage description information of this item of the storage resource. Alternatively, the task initiating apparatus can send the capacity resource distribution information and the storage resource distribution information of the information distributing apparatus stored thereby to the first server while sending the resource operation instruction to the first server. The first server can determine the target information distributing apparatus executing the resource operation instruction in the information distributing apparatus according to the capacity resource distribution information and the storage resource distribution information.

As aforementioned, for the terminal apparatus with high performance, the method for managing an apparatus and the information distributing apparatus according to the first embodiment to the third embodiment of the present disclosure and the method for controlling resource remotely, the server and the task initiating apparatus, according to the fourth and the fifth embodiment of the present disclosure can be used in combination with each other, and can be used individually. For example, when the method for managing the apparatus and the information distributing apparatus according to the first embodiment to the third embodiment of the present disclosure and the method for controlling resource remotely, the server and the task initiating apparatus according to the fourth and the fifth embodiment of the present disclosure are used in combination with each other, the terminal apparatus as the information distributing apparatus according to the first embodiment to the third embodiment of the present disclosure is preferably used as the task initiating apparatus according to the fourth and the fifth embodiment of the present disclosure. However, those skilled in the art can understand that, when there are other information distributing apparatus, the terminal apparatus as the information distributing apparatus according to the first embodiment to the third embodiment of the present disclosure can also used as the server.

Therefore, the method for managing an apparatus and the information distributing apparatus according to the embodiments of the present disclosure can be configured as follows:

(1) A method for managing an apparatus applied in information distributing apparatus, the method includes:

Obtaining a first apparatus identification of the information distributing apparatus, the first apparatus identification including a user identification, an identification of a first autonomy environment to which the information distributing apparatus belongs, and a second apparatus identification of the distributing apparatus in the first autonomy environment to which it belongs;

Obtaining a local capacity resource parameter of at least one item of apparatus capacity resource of the information distributing apparatus, the apparatus capacity resource being provided by an internal device that the information distributing apparatus has and/or a peripheral device connected to the information distributing apparatus in the first autonomy environment, and the local capacity resource parameter including a description parameter of this item of the apparatus capacity resource and a device identification of the internal device and/or the peripheral device providing this item of the apparatus capacity resource in the first autonomy environment;

Generating the capacity resource distribution information of this item of the apparatus capacity resource according to the first apparatus identification and the local capacity resource parameter of each item of the apparatus capacity resource;

Sending the capacity resource distribution information of the apparatus capacity resource to a first server through wide area network.

(2) The method according to the above (1), wherein,

The capacity resource distribution information includes a first universal resource identifier (URI), and the first URI indicates operation address of the device providing this item of the apparatus capacity resource;

The generating the capacity resource distribution information of this item of the apparatus capacity resource according to the first apparatus identification and the local capacity resource parameter of each item of the apparatus capacity resource includes:

Generating the first URI according to the first apparatus identification and the device identification in the local capacity resource parameter.

(3) The method according to the above (1), wherein,

The apparatus capacity resource includes at least part of the functions that can be provided by the internal device and/or the peripheral device of the distributing apparatus.

(4) The method according to the above (1), wherein,

The sending the capacity resource distribution information of the apparatus capacity resource to the first server through the wide area network includes:

Sending the capacity resource distribution information of the apparatus capacity resource to the first server through the wide area network via an agency apparatus connected to the wide area network in the first autonomy environment, Wherein, the agency apparatus has a wide area network address that can be used in the wide area network, the agency apparatus is for forwarding the distribution information from the information distributing apparatus to the server when the information distributing apparatus does not have the wide area network address that can be used in the wide area network.

(5) The method according to the above (1), wherein,

The generating the capacity resource distribution information of this item of the apparatus capacity resource includes:

Generating the capacity resource distribution information according to HTTP protocol and/or XMPP protocol;

The sending the capacity resource distribution information of the apparatus capacity resource to the first server through the wide area network includes:

Sending the capacity resource distribution information of the apparatus capacity resource to the first server by using HTTP protocol through the wide area network when the capacity resource distribution information is generated according to HTTP protocol, and the first server being a server using HTTP protocol; and Sending the capacity resource distribution information of the apparatus capacity resource to the first server by using XMPP protocol through the wide area network when the capacity resource distribution information is generated according to XMPP protocol, and the first server being a server using XMPP protocol.

(6) The method according to the above (5), wherein,

The capacity resource distribution information generated according to HTTP protocol corresponds to the capacity resource distribution information generated according to XMPP protocol; and The capacity resource distribution information generated according to HTTP protocol and the capacity resource distribution information generated according to HTTP protocol can be interconverted.

(7) The method according to the above (1), wherein,

The description parameter of the apparatus capacity resource includes one or more of the operation mode, the resource type, the resource name, the distribution expiry date of the resource, the description of the access method of the resource, the attribute description of the resource and device name of this item of the apparatus capacity resource.

(8) The method according to the above (1), further includes

Receiving a third apparatus identification in the first autonomy environment of the terminal apparatus in the first autonomy environment to which the distributing apparatus belongs as well as a remote end capacity resource parameter of at least one item of the apparatus capacity resource of the terminal apparatus;

The capacity resource distribution information of this item of the apparatus capacity resource of the terminal apparatus is generated according to the first apparatus identification, the third apparatus identification and the remote end capacity resource parameter of each item of the apparatus capacity resource of the terminal apparatus;

Sending the capacity resource distribution information of terminal apparatus to the first server through wide area network.

(9) The method according to the above (1), after sending the capacity resource distribution information of the apparatus capacity resource to the first server through the wide area network, further includes:

Receiving a capacity resource access request;

Determining a target apparatus capacity resource corresponding to the capacity resource access request in the apparatus capacity resource according to the capacity resource distribution information; and Executing the capacity resource access request through the target apparatus capacity resource.

(10) A method for managing apparatus applied in information distributing apparatus, the method includes:

Obtaining a first apparatus identification of the information distributing apparatus, the first apparatus identification includes a user identification, an identification of a first autonomy environment to which the information distributing apparatus belongs, and a second apparatus identification of the distributing apparatus in the first autonomy environment to which it belongs;

Obtaining a local storage resource parameter of at least one item of storage resource of the information distributing apparatus, the local storage resource parameter including description parameter of this item of the storage resource and storage identification indicating storage location of the storage resource with respect to the information distributing apparatus, and the storage resource including local data stored in the information distributing apparatus, data entry information stored in relation database of the information distributing apparatus, data stream generated by the information distributing apparatus and/or remote end data stored in a second server that can be connected with the information distributing apparatus;

Generating the storage resource distribution information of this item of the storage resource according to the first apparatus identification and the local storage resource parameter of each item of the storage resource;

Sending the storage resource distribution information of the storage resource to the first server through wide area network.

(11) The method according to the above (10), wherein,

The storage resource distribution information includes a second universal resource identifier (URI), the second URI indicates storage path of this item of the storage resource;

The generating the storage resource distribution information of this item of the storage resource according to the first apparatus identification and the local storage resource parameter of each item of the storage resource includes:

Generating the second URI according to the first apparatus identification and the storage identification in the local storage resource parameter.

(12) The method according to the above (10), wherein,

The sending the storage resource distribution information of the storage resource to the first server through the wide area network includes:

Sending the storage resource distribution information of the storage resource to the first server through the wide area network via an agency apparatus connected to the wide area network in the first autonomy environment, Wherein, the agency apparatus has a wide area network address that can be used in the wide area network, the agency apparatus is for forwarding the distribution information from the information distributing apparatus to the server when the information distributing apparatus does not have the wide area network address that can be used in the wide area network.

(13) The method according to the above (10), wherein,

The generating the storage resource distribution information of this item of the storage resource includes:

Generating the storage resource distribution information of this item of the storage resource according to HTTP protocol and/or XMPP protocol;

Sending the storage resource distribution information of the storage resource to the first server through the wide area network includes:

Sending the storage resource distribution information of the storage resource to the first server by using HTTP protocol through the wide area network when the storage resource distribution information is generated according to HTTP protocol, and the first server being a server using HTTP protocol; and Sending the storage resource distribution information of the storage resource to the first server by using XMPP protocol through the wide area network when the storage resource distribution information is generated according to XMPP protocol, and the first server being a server using XMPP protocol.

(14) The method according to the above (13), wherein,

The storage resource distribution information of the storage resource generated according to HTTP protocol corresponds to the storage resource distribution information of the storage resource generated according to XMPP protocol; and The storage resource distribution information of the storage resource generated according to HTTP protocol and the storage resource distribution information of the storage resource generated according to XMPP protocol can be interconverted.

(15) The method according to the above (10), wherein,

The description parameter of the storage resource includes one or more of operation mode, resource type, file name, distribution time, and update time of this item of the storage resource.

(16) The method according to the above (10), further includes:

Receiving a third apparatus identification in the first autonomy environment of the terminal apparatus in the first autonomy environment to which the distributing apparatus belongs as well as remote end storage resource parameter of at least one item of the storage resource of the terminal apparatus;

The capacity resource distribution information of this item of the storage resource of the terminal apparatus is generated according to the first apparatus identification, the third apparatus identification and the remote end storage resource parameter of each item of the storage resource of the terminal apparatus;

Sending the storage resource distribution information of the terminal apparatus to the first server through the wide area network.

(17) the method according to the above (10), further includes:

Receiving a storage resource access request;

Determining target storage path of target storage resource corresponding to the storage resource access request in the storage resource according to the storage resource distribution information; and Acquiring the target storage resource according to the target storage path.

(18) An information distributing apparatus, includes:

An identification managing unit configured to obtain a first apparatus identification of the information distributing apparatus, the first apparatus identification including a user identification, a identification of an first autonomy environment to which the information distributing apparatus belongs, and a second apparatus identification of the information distributing apparatus in the first autonomy environment to which it belongs;

A capacity resource managing unit configured to obtain a local capacity resource parameter of at least one item of apparatus capacity resource of the information distributing apparatus, the apparatus capacity resource being provided by an internal device that the information distributing apparatus has and/or a peripheral device connected to the information distributing apparatus in the first autonomy environment, and the local capacity resource parameter including a description parameter of this item of the apparatus capacity resource and a device identification of the internal device and/or the peripheral device providing this item of the apparatus capacity resource in the first autonomy environment;

An information generating unit configured to generate the capacity resource distribution information of this item of the apparatus capacity resource according to the first apparatus identification and the local capacity resource parameter of each item of the apparatus capacity resource;

A resource distributing unit configured to send the capacity resource distribution information of the apparatus capacity resource to the first server through wide area network.

(19) The information distributing apparatus according to the above (18), wherein, The capacity resource distribution information includes a first universal resource identifier (URI), and the first URI indicates operation address of the device providing this item of the apparatus capacity resource; and The information generating unit generates the first URI according to the first apparatus identification and the device identification in the local capacity resource parameter.

(20) The information distributing apparatus according to the above (18), wherein, The apparatus capacity resource includes at least a part of the functions that can be provided by the internal device and/or the peripheral device of the distributing apparatus.

(21) The information distributing apparatus according to the above (18), wherein, The resource distributing unit sends the capacity resource distribution information of the apparatus capacity resource to the first server through the wide area network via an agency apparatus connected to the wide area network in the first autonomy environment, Wherein, the agency apparatus has a wide area network address that can be used in the wide area network, the agency apparatus is for forwarding the distribution information from the information distributing apparatus to the server when the information distributing apparatus does not have the wide area network address that can be used in the wide area network.

(22) The information distributing apparatus according to the above (18), wherein, The capacity resource managing unit is further configured to receive a third apparatus identification in the first autonomy environment of the terminal apparatus in the first autonomy environment to which the information distributing apparatus belongs as well as a remote end capacity resource parameter of at least one item of the apparatus capacity resource of the terminal apparatus;

The information generating unit is further configured to generate the capacity resource distribution information of this item of the apparatus capacity resource of the terminal apparatus according to the first apparatus identification, the third apparatus identification and the remote end capacity resource parameter of each item of the apparatus capacity resource of the terminal apparatus;

The resource distributing unit is further configured to send the capacity resource distribution information of the terminal apparatus to the first server through the wide area network.

(23) The information distributing apparatus according to the above (18), further includes:

A receiving unit configured to receive a capacity resource access request; and

A first request managing unit configured to determine target apparatus capacity resource corresponding to the capacity resource access request in the apparatus capacity resource according to the capacity resource distribution information, to execute the capacity resource access request through the target apparatus capacity resource.

(24) An information distributing apparatus, includes:

An identification managing unit configured to obtain a first apparatus identification of the information distributing apparatus, the first apparatus identification including a user identification, a identification of an first autonomy environment to which the information distributing apparatus belongs, and a second apparatus identification of the information distributing apparatus in the first autonomy environment to which it belongs;

A storage resource managing unit configured to obtain a local storage resource parameter of at least one item of storage resource of the information distributing apparatus, the local storage resource parameter including description parameter of this item of the storage resource and storage identification indicating storage location of the storage resource with respect to the information distributing apparatus, and the storage resource including local data stored in the information distributing apparatus, data entry information stored in relation database of the information distributing apparatus, data stream generated by the information distributing apparatus and/or remote end data stored in a second server that can be connected with the information distributing apparatus;

An information generating unit configured to generate the storage resource distribution information of this item of the storage resource according to the first apparatus identification and the local storage resource parameter of each item of the storage resource;

A resource distributing unit configured to send the storage resource distribution information of the storage resource to the first server through wide area network.

(25) The information distributing apparatus according to the above (24), wherein The storage resource distribution information includes a second universal resource identifier (URI), the second URI indicates storage path of this item of the storage resource;

The information generating unit generates the second URI according to the first apparatus identification and the store identification in the local storage resource parameter.

(26) The information distributing apparatus according to the above (24), further includes:

The capacity resource managing unit is further configured to receive a third apparatus identification in the first autonomy environment of the terminal apparatus in the first autonomy environment to which the information distributing apparatus belongs as well as a remote end storage resource parameter of at least one item of the storage resource of the terminal apparatus;

The information generating unit is further configured to generate the storage resource distribution information of this item of the storage resource of the terminal apparatus according to the first apparatus identification, the third apparatus identification and the remote end storage resource parameter of each item of the storage resource of the terminal apparatus;

The resource distributing unit is further configured to send the storage resource distribution information of the terminal apparatus to the first server through the wide area network.

(27) The information distributing apparatus according to the above (24), further includes:

A receiving unit for receiving a storage resource access request; and

A second request managing unit configured to determine target storage path of target storage resource corresponding to the storage resource access request in the storage resource according to the storage resource distribution information, to acquire the target storage resource according to the target storage path.

Further, when the method for managing an apparatus according to the embodiments of the present disclosure is applied to control resource remotely, the method for managing the apparatus of the embodiments of the present disclosure is configured as follows:

(28) The method according to the above (1) or (10) applied in a terminal apparatus as a first server to carry out the remote control of the resource, wherein A capacity resource distribution information and a storage resource distribution information received from at least one information distributing apparatus through the wide area network are stored in the first server, Each item of the capacity resource distribution information includes a first operation address of capacity providing device providing this item of capacity resource and accessible through the wide area network as well as capacity description information of this item of capacity resource, Each item of the storage resource distribution information includes a first storage address of this item of the storage resource and accessible through the wide area network as well as storage description information of this item of the storage resource, The method further includes:

Receiving a remote operation instruction from a task initiating apparatus;

Obtaining at least one execution route for executing the remote operation instruction and atom motion included in each execution route according to the capacity resource distribution information and the storage resource distribution information, the atom motion being an operation executed by one capacity providing device without being interrupted by application program schedule mechanism;

Obtaining a first weighting score of each atom motion, the first weighting score indicating execution cost required by the atom motion;

Computing a second weighting score of each execution route according to the first weighting score of each atom motion, the second weighting score indicating execution cost required by the execution route;

Determining the execution route with the least execution cost as the target execution route according to the second weighting score;

Determining the capacity providing device executing the atom motion included in the target execution route as the target capacity providing device; and Sending a motion execution command for executing the corresponding atom motion to the target capacity providing device.

(29) The method according to the above (28), wherein, the obtaining the first weighting score of each atom motion includes:

Obtaining the first weighting score of each atom motion according to the capacity description information in the capacity resource distribution information.

(30) The method according to the above (28) or (29), wherein,

The capacity description information includes at least resource name of this item of the apparatus capacity resource and attribute description of the apparatus providing this item of the apparatus capacity resource.

(31) The method according to the above (29), wherein, the obtaining the first weighting score of each atom motion further includes:

Obtaining the first weighting score of each atom motion according to storage description information in the storage resource distribution information.

(32) The method according to the above (28) or (31), wherein,

The description parameter of the storage resource includes one or more of operation mode, resource type, file name, distribution time, and update time of this item of the storage resource.

(33) The method according to the above (28), wherein,

The capacity resource being provided by the internal device that the information distributing apparatus has and/or the peripheral device connected to the information distributing apparatus in the first autonomy environment to which the information distributing apparatus belongs, wherein The first operation address includes the first apparatus identification of the information distributing apparatus and device identification of the internal device and/or the peripheral device providing this item of capacity resource in the first autonomy environment;

The storage resource includes local data stored in the information distributing apparatus, data entry information stored in relation database of the information distributing apparatus, data stream generated in the information distributing apparatus, and/or remote end data stored in a second server that can be connected with the information distributing apparatus, The first storage address includes the first apparatus identification of the information distributing apparatus and storage identification of storage location of the storage resource with respect to the information distributing apparatus;

The first apparatus identification includes user identification, an identification of the first autonomy environment, and a second apparatus identification in the first autonomy environment to which the information distributing apparatus belongs.

(34) The method according to the above (33), further includes:

Receiving the user identification sent by the task initiating apparatus;

Obtaining at least one execution route for executing the remote operation instruction and atom motion included in each execution route according to the capacity resource distribution information and the storage resource distribution information includes:

Obtaining the capacity resource distribution information and the storage resource distribution information that match the user identification in the capacity resource distribution information and the storage resource distribution information; and Obtaining at least one execution route for executing the remote operation instruction and atom motion included in each execution route according to the capacity resource distribution information and the storage resource distribution information that match the user identification.

(35) The method according to the above (28), further includes:

Sending the atom motion included in the target execution route to the task initiating apparatus;

Receiving an execution route of the atom motion included in the target execution route from the target capacity providing device; and Sending the execution route of the atom motion included in the target execution route to the task initiating apparatus.

(36) The method according to the above (35), further includes:

Receiving a first motion cancel instruction from the task initiating apparatus;

Determining a first atom motion in the atom motion included in the target execution route according to the first motion cancel instruction;

Determining a first capacity providing device for executing the first atom motion in the target capacity providing device; and Sending a second motion cancel instruction to the first capacity providing device, wherein the first capacity providing device cancels the execution of the first atom motion according to the second motion cancel instruction.

(37) The method according to the above (28), further includes:

Receiving an execution result after completing the execution of the target execution route; and Sending the execution result to the task initiating apparatus.

(38) The method according to the above (1) or (10) applied in a terminal apparatus as a task initiating apparatus to carry out the remote control of the resource, the method further includes:

Logging in a first server via wide area network;

Receiving a capacity resource distribution information and a storage resource distribution information stored in the first server from the first server, wherein each item of the capacity resource distribution information includes a first operation address of capacity providing device providing this item of capacity resource and accessible through the wide area network as well as capacity description information of this item of capacity resource, and each item of the storage resource distribution information includes a first storage address of this item of the storage resource and accessible through the wide area network as well as storage description information of this item of the storage resource, Displaying the received capacity resource distribution information and storage resource distribution information;

Receiving an operation instruction from a user;

Determining whether the operation instruction is a remote operation instruction; and Sending the remote operation instruction to the first server when the operation instruction is remote operation instruction, Wherein, the first server obtains a target execution route for executing the remote operation instruction and atom motion included in the target execution route according to the capacity resource distribution information and the storage resource distribution information, determines the capacity providing device executing the atom motion included in the target execution route as the target capacity providing device, and sends motion execution command for executing the corresponding atom motion to the target capacity providing device, The atom motion is an operation executed by one capacity providing device without being interrupted by application program schedule mechanism.

(39) The method according to the above (38), wherein,

The logging in a first server via wide area network includes:

Logging in a first server via wide area network with a user identification;

The receiving the capacity resource distribution information and the storage resource distribution information stored in the first server from the first server includes:

Receiving the capacity resource distribution information and the storage resource distribution information stored in the first server and that match the user identification from the first server.

(40) The method according to the above (38), further includes,

Receiving an execution result after completing the execution of the target execution route.

(41) The method according to the above (38), further includes,

Receiving atom motion included in the target execution route and the execution route of the atom motion included in the target execution route from the first server.

(42) The method according to the above (41), further includes,

Determining a first atom motion in the atom motion included in the target execution route according to a cancel input of the user;

Generating a first motion cancel instruction indicating the cancel of the first atom motion;

Sending the first motion cancel instruction to the first server,

Wherein, the first server determines the first atom motion in the atom motions included in the target execution route according to the first motion cancel instruction, and determines a first capacity providing device for executing the first atom motion in the target capacity providing device, and sends a second motion cancel instruction to the first capacity providing device, the first capacity providing device cancels the execution of the first atom motion according to the second motion cancel instruction.

Further, when the information distributing apparatus according to the embodiments of the present disclosure is used as the server for controlling resource remotely, the information distributing apparatus of the embodiments of the present disclosure is configured as follows:

(43) The information distributing apparatus according to the above (18) or (24), the information distributing apparatus is used as the server and further includes:

A storing unit configured to store a capacity resource distribution information and a storage resource distribution information received from at least one information distributing apparatus through wide area network, each item of the capacity resource distribution information including a first operation address of capacity providing device providing this item of capacity resource and accessible through the wide area network as well as capacity description information of this item of capacity resource, and each item of the storage resource distribution information including a first storage address of this item of the storage resource and accessible through the wide area network as well as storage description information of this item of the storage resource;

A second receiving unit configured to receive remote operation instruction from task initiating apparatus;

A parsing unit configured to obtain at least one execution route executing the remote operation instruction and atom motion included in each execution route according to the capacity resource distribution information and the storage resource distribution information, wherein the atom motion is an operation executed by one capacity providing device without being interrupted by the application program schedule mechanism;

A first weighting unit configured to obtain a first weighting score of each atom motion, the first weighting score indicating execution cost required by the atom motion;

A second weighting unit configured to compute a second weighting score of each execution route according to the first weighting score of each atom motion, the second weighting score indicating execution cost required by the execution route;

A route selecting unit configured to determine the execution route with the least execution cost as the target execution route according to the second weighting score;

A device determining unit configured to determine the capacity providing device executing the atom motion included in the target execution route as the target capacity providing device; and A transmitting unit configured to send motion execution command for executing the corresponding atom motion to the target capacity providing device.

(44) The information distributing apparatus according to the above (43), wherein The first weighting unit obtains the first weighting score of each atom motion according to the capacity description information in the capacity resource distribution information.

(45) The information distributing apparatus according to the above (43) or (44), wherein, The capacity description information includes at least resource name of this item of the apparatus capacity resource and attribute description of the apparatus providing this item of the apparatus capacity resource.

(46) The information distributing apparatus according to the above (44), wherein The first weighting unit further obtains the first weighting score of each atom motion according to storage description information in the storage resource distribution information.

(47) The information distributing apparatus according to the above (43) or (46), wherein, The description parameter of the storage resource includes one or more of operation mode, resource type, file name, distribution time, and update time of this item of the storage resource.

(48) The information distributing apparatus according to the above (43), wherein, The capacity resource is provided by the internal device that the information distributing apparatus has and/or the peripheral device connected to the information distributing apparatus in the first autonomy environment to which the information distributing apparatus belongs, wherein The first operation address includes the first apparatus identification of the information distributing apparatus and device identification of the internal device and/or the peripheral device providing this item of capacity resource in the first autonomy environment;

The storage resource includes local data stored in the information distributing apparatus, data entry information stored in relation database of the information distributing apparatus, data stream generated in the information distributing apparatus, and/or remote end data stored in a second server that can be connected with the information distributing apparatus, The first storage address includes the first apparatus identification of the information distributing apparatus and storage identification of storage location of the storage resource with respect to the information distributing apparatus;

The first apparatus identification includes a user identification, an identification of the first autonomy environment, and a second apparatus identification in the first autonomy environment to which the information distributing apparatus belongs.

(49) The information distributing apparatus according to the above (48), wherein, The receiving unit is further configured to receive user identification sent by the task initiating apparatus;

The parsing unit obtains the capacity resource distribution information and the storage resource distribution information that match the user identification in the capacity resource distribution information and the storage resource distribution information, and obtains the at least one execution route for executing the remote operation instruction and the atom motion included in each execution route according to the capacity resource distribution information and the storage resource distribution information that match the user identification.

(50) The information distributing apparatus according to the above (43), wherein The transmitting unit is further configured to send the atom motion included in the target execution route to the task initiating apparatus;

The receiving unit is further configured to receive execution route of the atom motion included in the target execution route from the target capacity providing device; and The transmitting unit is further configured to send the execution route of the atom motion included in the target execution route to the task initiating apparatus.

(51) The information distributing apparatus according to the above (50), wherein The receiving unit is further configured to receive a first motion cancel instruction from the task initiating apparatus;

The route selecting unit is further configured to determine a first atom motion in the atom motion included in the target execution route according to the first motion cancel instruction;

The device determining unit is further configured to determine a first capacity providing device for executing the first atom motion in the target capacity providing device; and The transmitting unit is further configured to send a second motion cancel instruction to the first capacity providing device, wherein the first capacity providing device cancels the execution of the first atom motion according to the second motion cancel instruction.

(52) The information distributing apparatus according to the above (43), wherein The receiving unit is further configured to receive an execution result after completing the execution of the target execution route; and The transmitting unit is further configured to send the execution result to the task initiating apparatus.

Further, when the information distributing apparatus according to the embodiments of the present disclosure is used as the task initiating apparatus for controlling resource remotely, the information distributing apparatus of the embodiments of the present disclosure is configured as follows:

(53) The information distributing apparatus according to the above (18) or (24), the information distributing apparatus is used as the task initiating apparatus and further includes:

A logging control unit configured to log in a first server via wide area network;

A second receiving unit configured to receive a capacity resource distribution information and a storage resource distribution information stored in a first server from the first server, wherein each item of the capacity resource distribution information includes a first operation address of capacity providing device providing this item of capacity resource and accessible through the wide area network as well as capacity description information of this item of capacity resource, and each item of the storage resource distribution information including a first storage address of this item of the storage resource and accessible through the wide area network as well as storage description information of this item of the storage resource;

A display unit configured to display the received capacity resource distribution information and storage resource distribution information;

An input unit configured to receive an operation instruction from a user;

An instruction determining unit configured to determine whether the operation instruction is a remote operation instruction; and A transmitting unit configured to send the remote operation instruction to the first server when the operation instruction is remote operation instruction, Wherein, the first server obtains target execution route for executing the remote operation instruction and atom motion included in the target execution route according to the capacity resource distribution information and the storage resource distribution information, determines the capacity providing device executing the atom motion included in the target execution route as the target capacity providing device, and sends motion execution command for executing the corresponding atom motion to the target capacity providing device, The atom motion is an operation executed by one capacity providing device without being interrupted by application program schedule mechanism.

(54) The information distributing apparatus according to the above (53), wherein The logging control unit logs in the first server via the wide area network with a user identification;

The receiving unit receives the capacity resource distribution information, the storage resource distribution information stored in the first server, and that match the user identification from the first server.

(55) The information distributing apparatus according to the above (53), wherein The receiving unit is further configured to receive an execution result after completing the execution of the target execution route.

(56) The information distributing apparatus according to the above (53), wherein The receiving unit is further configured to receive atom motion included in the target execution route and execution route of the atom motion included in the target execution route from the first server.

(57) The information distributing apparatus according to the above (56), wherein The input selecting unit is further configured to determine a first atom motion in the atom motion included in the target execution input according to a cancel input of the user;

The task initiating apparatus further includes:

An instruction generating unit configured to generate a first motion cancel instruction indicating cancel of the first atom motion;

The transmitting unit is further configured to send the first motion cancel instruction to the first server, Wherein, the first server determines the first atom motion in the atom motions included in the target execution route according to the first motion cancel instruction, and determines a first capacity providing device for executing the first atom motion in the target capacity providing device, and sends a second motion cancel instruction to the first capacity providing device, the first capacity providing device cancels the execution of the first atom motion according to the second motion cancel instruction.

(58) The information distributing apparatus according to the above (18) or (24), the information distributing apparatus is used as the task initiating apparatus and further includes:

A display unit configured to display the capacity resource distribution information and the storage resource distribution information, wherein, the capacity resource distribution information is information of capacity that the first information distributing apparatus has; the storage resource distribution information is information of the resource stored by the second information distributing apparatus;

An input unit configured to receive resource operation instruction of target resource in the capacity resource indicated by the capacity resource distribution information and the storage resource indicated by the storage resource distribution information from the user; and A transmitting unit configured to send the resource operation instruction to the first server, Wherein, the first server determines the target information distributing apparatus executing the resource operation instruction in the information distributing apparatus according to the capacity resource distribution information and the storage resource distribution information.

Of course, those skilled in the art can understand, when the method for managing an apparatus and information distributing apparatus, according to the first to the third embodiments of the present disclosure, and the method for controlling resource remotely, the server and the task initiating apparatus according to the fourth and the fifth embodiments of the present disclosure are used in combination with each other. The respective steps or component elements in the above-described method for managing the apparatus and information distributing apparatus are combined arbitrarily with the steps or component elements in the above-described method for controlling resource remotely, the server, and the task initiating apparatus, instead of being limited to the above-described configuration as (28) to (58).

Further, the method for controlling resource remotely, the server and the task initiating apparatus according to the embodiments of the present disclosure are configured as follows:

(59) A method for controlling resource remotely applied in a first server, wherein, Storing a capacity resource distribution information and a storage resource distribution information received from at least one information distributing apparatus through the wide area network in the first server, Each item of the capacity resource distribution information including a first operation address of capacity providing device providing this item of capacity resource and accessible through the wide area network as well as capacity description information of this item of capacity resource, Each item of the storage resource distribution information including a first storage address of this item of the storage resource and accessible through the wide area network as well as storage description information of this item of the storage resource, The method includes:

Receiving a remote operation instruction from a task initiating apparatus;

Obtaining at least one execution route for executing the remote operation instruction and atom motion included in each execution route according to the capacity resource distribution information and the storage resource distribution information, the atom motion being an operation executed by one capacity providing device without being interrupted by application program schedule mechanism;

Obtaining a first weighting score of each atom motion, the first weighting score indicating execution cost required by the atom motion;

Computing a second weighting score of each execution route according to the first weighting score of each atom motion, the second weighting score indicating execution cost required by the execution route;

Determining the execution route with the least execution cost as the target execution route according to the second weighting score;

Determining the capacity providing device executing the atom motion included in the target execution route as the target capacity providing device; and Sending a motion execution command for executing the corresponding atom motion to the target capacity providing device.

(60) The method according to the above (59), wherein, the obtaining the first weighting score of each atom motion includes:

Obtaining the first weighting score of each atom motion according to the capacity description information in the capacity resource distribution information.

(61) The method according to the above (59) or (60), wherein,

The capacity description information includes at least resource name of this item of the apparatus capacity resource and attribute description of the apparatus providing this item of the apparatus capacity resource.

(62) The method according to the above (60), wherein, the obtaining the first weighting score of each atom motion further includes:

Obtaining the first weighting score of each atom motion according to storage description information in the storage resource distribution information.

(63) The method according to the above (59) or (62), wherein,

The description parameter of the storage resource includes one or more of operation mode, resource type, file name, distribution time, and update time of this item of the storage resource.

(64) The method according to the above (59), wherein,

The capacity resource is provided by the internal device that the information distributing apparatus has and/or the peripheral device connected to the information distributing apparatus in the first autonomy environment to which the information distributing apparatus belongs, wherein The first operation address includes the first apparatus identification of the information distributing apparatus and device identification of the internal device and/or the peripheral device providing this item of capacity resource in the first autonomy environment;

The storage resource includes local data stored in the information distributing apparatus, data entry information stored in relation database of the information distributing apparatus, data stream generated in the information distributing apparatus, and/or remote end data stored in a second server that can be connected with the information distributing apparatus, The first storage address includes the first apparatus identification of the information distributing apparatus and storage identification of storage location of the storage resource with respect to the information distributing apparatus;

The first apparatus identification includes a user identification, an identification of the first autonomy environment, and a second apparatus identification in the first autonomy environment to which the information distributing apparatus belongs.

(65) The method according to the above (64), further includes:

Receiving the user identification sent by the task initiating apparatus;

Obtaining at least one execution route for executing the remote operation instruction and atom motion included in each execution route according to the capacity resource distribution information and the storage resource distribution information includes:

Obtaining the capacity resource distribution information and the storage resource distribution information that match the user identification in the capacity resource distribution information and the storage resource distribution information; and Obtaining at least one execution route for executing the remote operation instruction and atom motion included in each execution route according to the capacity resource distribution information and the storage resource distribution information that match the user identification.

(66) The method according to the above (59), further includes:

Sending the atom motion included in the target execution route to the task initiating apparatus;

Receiving an execution route of the atom motion included in the target execution route from the target capacity providing device; and Sending the execution route of the atom motion included in the target execution route to the task initiating apparatus.

(67) The method according to the above (66), further includes:

Receiving a first motion cancel instruction from the task initiating apparatus;

Determining a first atom motion in the atom motion included in the target execution route according to the first motion cancel instruction;

Determining a first capacity providing device for executing the first atom motion in the target capacity providing device; and Sending a second motion cancel instruction to the first capacity providing device, wherein the first capacity providing device cancels the execution of the first atom motion according to the second motion cancel instruction.

(68) The method according to the above (59), further includes:

Receiving an execution result after completing the execution of the target execution route; and Sending the execution result to the task initiating apparatus.

(69) A method for controlling resource remotely applied in a task initiating apparatus, the method includes:

Logging in a first server via wide area network;

Receiving a capacity resource distribution information and a storage resource distribution information stored in the first server from the first server, wherein each item of the capacity resource distribution information includes a first operation address of capacity providing device providing this item of capacity resource and can be accessed through the wide area network as well as capacity description information of this item of capacity resource, and each item of the storage resource distribution information includes a first storage address of this item of the storage resource and can be accessed through the wide area network as well as storage description information of this item of the storage resource, Displaying the received capacity resource distribution information and storage resource distribution information;

Receiving an operation instruction from user;

Determining whether the operation instruction is a remote operation instruction; and Sending the remote operation instruction to the first server when the operation instruction is remote operation instruction, Wherein, the first server obtains target execution route for executing the remote operation instruction and atom motion included in the target execution route according to the capacity resource distribution information and the storage resource distribution information, determines the capacity providing device executing the atom motion included in the target execution route as the target capacity providing device, and sends motion execution command for executing the corresponding atom motion to the target capacity providing device, The atom motion is an operation executed by one capacity providing device without being interrupted by application program schedule mechanism.

(70) The method according to the above (69), wherein,

The logging in a first server via wide area network includes:

Logging in a first server via wide area network with a user identification;

The receiving the capacity resource distribution information and the storage resource distribution information stored in the first server from the first server includes:

Receiving the capacity resource distribution information and the storage resource distribution information stored in the first server and that match the user identification from the first server.

(71) The method according to the above (69), further includes,

Receiving an execution result after completing the execution of the target execution route; and

(72) The method according to the above (69), further includes,

Receiving atom motion included in the target execution route and the execution route of the atom motion included in the target execution route from the first server.

(73) The method according to the above (72), further includes,

Determining a first atom motion in the atom motion included in the target execution route according to a cancel input of the user;

Generating a first motion cancel instruction indicating the cancel of the first atom motion;

Sending the first motion cancel instruction to the first server,

Wherein, the first server determines the first atom motion in the atom motions included in the target execution route, according to the first motion cancel instruction, and determines a first capacity providing device for executing, the first atom motion in the target capacity providing device, and sends a second motion cancel instruction to the first capacity providing device, the first capacity providing device cancels the execution of the first atom motion according to the second motion cancel instruction.

(74) A server, includes:

A storing unit configured to store a capacity resource distribution information and a storage resource distribution information received from at least one information distributing apparatus through wide area network, each item of the capacity resource distribution information including a first operation address of capacity providing device providing this item of capacity resource and accessible through the wide area network as well as capacity description information of this item of capacity resource, and each item of the storage resource distribution information including a first storage address of this item of the storage resource and accessible through the wide area network as well as storage description information of this item of the storage resource;

A receiving unit configured to receive a remote operation instruction from a task initiating apparatus;

A parsing unit configured to obtain at least one execution route executing the remote operation instruction and atom motion included in each execution route according to the capacity resource distribution information and the storage resource distribution information, wherein the atom motion is an operation executed by one capacity providing device without being interrupted by the application program schedule mechanism;

A first weighting unit configured to obtain a first weighting score of each atom motion, the first weighting score indicating execution cost required by the atom motion;

A second weighting unit configured to compute a second weighting score of each execution route according to the first weighting score of each atom motion, the second weighting score indicating execution cost required by the execution route;

A route selecting unit configured to determine the execution route with the least execution cost as the target execution route according to the second weighting score;

A device determining unit configured to determine the capacity providing device executing the atom motion included in the target execution route as the target capacity providing device; and A transmitting unit configured to send motion execution command for executing the corresponding atom motion to the target capacity providing device.

(75) The server according to the above (74), wherein,

The first weighting unit obtains the first weighting score of each atom motion according to the capacity description information in the capacity resource distribution information.

(76) The server according to the above (74) or (75), wherein,

The capacity description information includes at least resource name of this item of the apparatus capacity resource and attribute description of the apparatus providing this item of the apparatus capacity resource.

(77) The server according to the above (75), wherein,

The first weighting unit further obtains the first weighting score of each atom motion according to storage description information in the storage resource distribution information.

(78) The server according to the above (74) or (77), wherein,

The description parameter of the storage resource includes one or more of operation mode, resource type, file name, distribution time, and update time of this item of the storage resource.

(79) The server according to the above (74), wherein,

The capacity resource is provided by the internal device that the information distributing apparatus has and/or the peripheral device connected to the information distributing apparatus in the first autonomy environment to which the information distributing apparatus belongs, wherein The first operation address includes the first apparatus identification of the information distributing apparatus and device identification of the internal device and/or the peripheral device providing this item of capacity resource in the first autonomy environment;

The storage resource includes local data stored in the information distributing apparatus, data entry information stored in relation database of the information distributing apparatus, data stream generated in the information distributing apparatus, and/or remote end data stored in a second server that can be connected with the information distributing apparatus, The first storage address includes the first apparatus identification of the information distributing apparatus and storage identification of storage location of the storage resource with respect to the information distributing apparatus;

The first apparatus identification includes a user identification, an identification of the first autonomy environment, and a second apparatus identification in the first autonomy environment to which the information distributing apparatus belongs.

(80) The server according to the above (79), wherein,

The receiving unit is further configured to receive user identification sent by the task initiating apparatus;

The parsing unit obtains the capacity resource distribution information and the storage resource distribution information that match the user identification in the capacity resource distribution information and the storage resource distribution information, and obtains the at least one execution route for executing the remote operation instruction and the atom motion included in each execution route according to the capacity resource distribution information and the storage resource distribution information that match the user identification.

(81) The server according to the above (74), wherein,

The transmitting unit is further configured to send the atom motion included in the target execution route to the task initiating apparatus;

The receiving unit is further configured to receive execution route of the atom motion included in the target execution route from the target capacity providing device; and The transmitting unit is further configured to send the execution route of the atom motion included in the target execution route to the task initiating apparatus.

(82) The server according to the above (81), wherein,

The receiving unit is further configured to receive a first motion cancel instruction from the task initiating apparatus;

The route selecting unit is further configured to determine a first atom motion in the atom motion included in the target execution route according to the first motion cancel instruction;

The device determining unit is further configured to determine a first capacity providing device for executing the first atom motion in the target capacity providing device; and The transmitting unit is further configured to send a second motion cancel instruction to the first capacity providing device, wherein the first capacity providing device cancels the execution of the first atom motion according to the second motion cancel instruction.

(83) The server according to the above (74), wherein,

The receiving unit is further configured to receive an execution result after completing the execution of the target execution route; and The transmitting unit is further configured to send the execution result to the task initiating apparatus.

(84) A task initiating apparatus, includes:

A logging control unit configured to log in a first server via wide area network;

A receiving unit configured to receive a capacity resource distribution information and a storage resource distribution information stored in a first server from the first server, wherein each item of the capacity resource distribution information includes a first operation address of capacity providing device providing this item of capacity resource and accessible through the wide area network as well as capacity description information of this item of capacity resource, and each item of the storage resource distribution information includes a first storage address of this item of the storage resource and accessible through the wide area network as well as storage description information of this item of the storage resource;

A display unit configured to display the received capacity resource distribution information and storage resource distribution information;

An input unit configured to receive an operation instruction from user;

An instruction determining unit configured to determine whether the operation instruction is a remote operation instruction; and A transmitting unit configured to send the remote operation instruction to the first server when the operation instruction is remote operation instruction, Wherein, the first server obtains target execution route for executing the remote operation instruction and atom motion included in the target execution route according to the capacity resource distribution information and the storage resource distribution information, determines the capacity providing device executing the atom motion included in the target execution route as the target capacity providing device, and sends motion execution command for executing the corresponding atom motion to the target capacity providing device, The atom motion is an operation executed by one capacity providing device without being interrupted by application program schedule mechanism.

(85) The task initiating apparatus according to the above (84), wherein,

The logging control unit logs in the first server via the wide area network with a user identification;

The receiving unit receives the capacity resource distribution information, the storage resource distribution information stored in the first server, and that match the user identification from the first server.

(86) The task initiating apparatus according to the above (84), wherein,

The receiving unit is further configured to receive an execution result after completing the execution of the target execution route.

(87) The task initiating apparatus according to the above (84), wherein,

The receiving unit is further configured receive atom motion included in the target execution route and execution route of the atom motion included in the target execution route from the first server.

(88) The task initiating apparatus according to the above (87), wherein,

The input selecting unit is further configured to determine a first atom motion in the atom motion included in the target execution input according to a cancel input of the user;

The task initiating apparatus further includes:

An instruction generating unit configured to generate a first motion cancel instruction indicating cancel of the first atom motion;

The transmitting unit is further configured to send the first motion cancel instruction to the first server, Wherein, the first server determines the first atom motion in the atom motions included in the target execution route according to the first motion cancel instruction, and determines a first capacity providing device for executing the first atom motion in the target capacity providing device, and sends a second motion cancel instruction to the first capacity providing device, the first capacity providing device cancels the execution of the first atom motion according to the second motion cancel instruction.

(89) A task initiating apparatus, includes:

A display unit configured to display the capacity resource distribution information and the storage resource distribution information, wherein, the capacity resource distribution information is information of capacity that the first information distributing apparatus has; the storage resource distribution information is information of the resource stored by the second information distributing apparatus;

An input unit configured to receive resource operation instruction of target resource in the capacity resource indicated by the capacity resource distribution information and the storage resource indicated by the storage resource distribution information from the user; and A transmitting unit configured to send the resource operation instruction to the first server, Wherein, the first server determines the target information distributing apparatus executing the resource operation instruction in the information distributing apparatus according to the capacity resource distribution information and the storage resource distribution information.

Those skilled in the art can understand that, the units and the algorithm steps of the respective examples described in combination with the embodiments disclosed in this specification can be implemented by electronic hardware, computer software or the combination of both. Moreover, the software module can be in the storage medium of the computer of arbitrary form. In order to explain the interchangeability of the hardware and software clearly, the constitution and the steps of the respective example are described generally in terms of function in the above explanation. Whether the functions are executed by hardware or software is depending to the specific applications and design constraint of the technical solution. Those skilled in the art can implement the described function by using different methods for each specific application, and such implementations are not regarded as beyond the scope of the disclosure.

Those skilled in the art can understand that the disclosure can be made various modifications, combinations, partial combinations and alternation depending on the design need and other factors, so long as they are in the scope of the attached claims and the equivalents.

What is claimed is:

1. A method for managing an apparatus, which is applied in an information distributing apparatus, the method comprising:

obtaining a first apparatus identification of the information distributing apparatus, the first apparatus identification including a user identification, the first apparatus identification including an identification of a first autonomy environment to which the information distributing apparatus belongs, and the first apparatus identification including a second apparatus identification of the information distributing apparatus in the first autonomy environment to which the second apparatus identification belongs;

obtaining a local capacity resource parameter of at least one item of apparatus capacity resource of the information distributing apparatus, the apparatus capacity resource being provided by an internal device that the information distributing apparatus has and/or a peripheral device connected to the information distributing apparatus in the first autonomy environment, and the local capacity resource parameter including a description parameter of this item of the apparatus capacity resource and a device identification of the internal device and/or the peripheral device providing this item of the apparatus capacity resource in the first autonomy environment;

generating the capacity resource distribution information of this item of the apparatus capacity resource according to the first apparatus identification and the local capacity resource parameter of each item of the apparatus capacity resource; and sending the capacity resource distribution information of the apparatus capacity resource to a first server through wide area network;

the method further including:

receiving a third apparatus identification in the first autonomy environment of a terminal apparatus in the first autonomy environment to which the information distributing apparatus belongs as well as a remote end capacity resource parameter of at least one item of the apparatus capacity resource of the terminal apparatus;

wherein, the terminal apparatus is different to the information distributing apparatus in the first autonomy environment;

the capacity resource distribution information of this item of the apparatus capacity resource of the terminal apparatus is generated according to the first apparatus identification, the third apparatus identification and the remote end capacity resource parameter of each item of the apparatus capacity resource of the terminal apparatus;

sending the capacity resource distribution information of terminal apparatus to the first server through wide area network.

2. The method for managing an apparatus according to claim 1, wherein, the apparatus capacity resource includes at least part of the functions that can be provided by the internal device and/or the peripheral device of the information distributing apparatus.

3. The method for managing an apparatus according to claim 1, wherein, the sending the capacity resource distribution information of the apparatus capacity resource to the first server through the wide area network includes:
sending the capacity resource distribution information of the apparatus capacity resource to the first server through the wide area network via an agency apparatus connected to the wide area network in the first autonomy environment,
wherein, the agency apparatus has a wide area network address that can be used in the wide area network, the agency apparatus is for forwarding the distribution information from the information distributing apparatus to the server when the information distributing apparatus does not have the wide area network address that can be used in the wide area network.

4. The method for managing an apparatus according to claim 1, wherein,
the generating the capacity resource distribution information of this item of the apparatus capacity resource includes:
generating the capacity resource distribution information according to HTTP protocol and/or XMPP protocol;
the sending the capacity resource distribution information of the apparatus capacity resource to the first server through the wide area network includes:
sending the capacity resource distribution information of the apparatus capacity resource to the first server by using HTTP protocol through the wide area network when the capacity resource distribution information is generated according to HTTP protocol, and the first server being a server using HTTP protocol; and
sending the capacity resource distribution information of the apparatus capacity resource to the first server by using XMPP protocol through the wide area network when the capacity resource distribution information is generated according to XMPP protocol, and the first server being a server using XMPP protocol.

5. The method for managing an apparatus according to claim 4, wherein,
the capacity resource distribution information generated according to HTTP protocol corresponds to the capacity resource distribution information generated according to XMPP protocol; and
the capacity resource distribution information generated according to HTTP protocol and the capacity resource distribution information generated according to HTTP protocol can be interconverted.

6. The method for managing an apparatus according to claim 1, wherein,
the description parameter of the apparatus capacity resource includes one or more of the operation mode, the resource type, the resource name, the distribution expiry date of the resource, the description of the access method of the resource, the attribute description of the resource and device name of this item of the apparatus capacity resource.

7. The method for managing an apparatus according to claim 1, after sending the capacity resource distribution information of the apparatus capacity resource to the first server through the wide area network, further including:
receiving a capacity resource access request;
determining a target apparatus capacity resource corresponding to the capacity resource access request in the apparatus capacity resource according to the capacity resource distribution information; and
executing the capacity resource access request through the target apparatus capacity resource.

8. The method for managing an apparatus according to claim 1, applied in a terminal apparatus as a first server, wherein,
a capacity resource distribution information and a storage resource distribution information received from at least one information distributing apparatus through the wide area network are stored in the first server,
each item of the capacity resource distribution information includes a first operation address of a capacity providing device providing this item of capacity resource and accessible through the wide area network as well as capacity description information of this item of capacity resource,
each item of the storage resource distribution information includes a first storage address of this item of the storage resource and accessible through the wide area network as well as storage description information of this item of the storage resource,
the method further includes:
receiving a remote operation instruction from a task initiating apparatus;
obtaining at least one execution route for executing the remote operation instruction and atom motion included in each execution route according to the capacity resource distribution information and the storage resource distribution information, the atom motion being an operation executed by one capacity providing device without being interrupted by application program schedule mechanism;
obtaining a first weighting score of each atom motion, the first weighting score indicating execution cost required by the atom motion;
computing a second weighting score of each execution route according to the first weighting score of each atom motion, the second weighting score indicating execution cost required by the execution route;
determining the execution route with the least execution cost as the target execution route according to the second weighting score;
determining the capacity providing device executing the atom motion included in the target execution route as a target capacity providing device; and
sending a motion execution command for executing the corresponding atom motion to the target capacity providing device.

9. An information distributing apparatus, including:
an identification managing unit configured to obtain a first apparatus identification of the information distributing apparatus, the first apparatus identification including a user identification, the first apparatus identification including an identification of a first autonomy environment to which the information distributing apparatus belongs, and the first apparatus identification including a second apparatus identification of the information distributing apparatus in the first autonomy environment to which it belongs;
a capacity resource managing unit configured to obtain a local capacity resource parameter of at least one item of apparatus capacity resource of the information distributing apparatus, the apparatus capacity resource being provided by an internal device that the information distributing apparatus has and/or a peripheral device connected to the information distributing apparatus in the first autonomy environment, and the local capacity resource parameter including a description parameter of this item of the apparatus capacity resource and a device identification of the internal device and/or the peripheral device providing this item of the apparatus capacity resource in the first autonomy environment;

an information generating unit configured to generate the capacity resource distribution information of this item of the apparatus capacity resource according to the first apparatus identification and the local capacity resource parameter of each item of the apparatus capacity resource; and a resource distributing unit configured to send the capacity resource distribution information of the apparatus capacity resource to the first server through wide area network;

receiving unit configured to receive a third apparatus identification in the first autonomy environment of a terminal apparatus in the first autonomy environment to which the information distributing apparatus belongs as well as a remote end capacity resource parameter of at least one item of the apparatus capacity resource of the terminal apparatus;

wherein, the terminal apparatus is different to the information distributing apparatus in the first autonomy environment the information generating unit further configured to generate the capacity resource distribution information of this item of the apparatus capacity resource of the terminal apparatus according to the first apparatus identification, the third apparatus identification and the remote end capacity resource parameter of each item of the apparatus capacity resource of the terminal apparatus;

the resource distributing unit further configured to send the capacity resource distribution information of terminal apparatus to the first server through wide area network.

10. A method for controlling resource remotely applied in a first server, wherein a capacity resource distribution information and a storage resource distribution information received from at least one information distributing apparatus through the wide area network are stored in the first server, each item of the capacity resource distribution information includes a first operation address of capacity providing device providing this item of capacity resource and accessible through the wide area network as well as capacity description information of this item of capacity resource, each item of the storage resource distribution information includes a first storage address of this item of the storage resource and accessible through the wide area network as well as storage description information of this item of the storage resource, the method includes:

receiving a remote operation instruction from a task initiating apparatus;

obtaining at least one execution route for executing the remote operation instruction and atom motion included in each execution route according to the capacity resource distribution information and the storage resource distribution information, the atom motion being an operation executed by one capacity providing device without being interrupted by application program schedule mechanism;

obtaining a first weighting score of each atom motion, the first weighting score indicating execution cost required by the atom motion;

computing a second weighting score of each execution route according to the first weighting score of each atom motion, the second weighting score indicating execution cost required by the execution route;

determining the execution route with the least execution cost as a target execution route according to the second weighting score;

determining the capacity providing device executing the atom motion included in the target execution route as the target capacity providing device; and sending a motion execution command for executing the corresponding atom motion to the target capacity providing device;

wherein, the first operation address includes the first apparatus identification of the information distributing apparatus;

the first apparatus identification includes a user identification, the first apparatus identification includes an identification of the first autonomy environment, and the first apparatus identification includes a second apparatus identification in the first autonomy environment to which the information distributing apparatus belongs;

the method further including:

receiving the user identification sent by the task initiating apparatus;

wherein, the task initiating apparatus can control the information distributing apparatus through a server;

the obtaining at least one execution route for executing the remote operation instruction and atom motion included in each execution route according to the capacity resource distribution information and the storage resource distribution information includes:

obtaining the capacity resource distribution information and the storage resource distribution information that match the user identification in the capacity resource distribution information and the storage resource distribution information; and obtaining at least one execution route for executing the remote operation instruction and atom motion included in each execution route according to the capacity resource distribution information and the storage resource distribution information that match the user identification.

11. The method according to claim 10, wherein, the obtaining the first weighting score of each atom motion includes:

obtaining the first weighting score of each atom motion according to the capacity description information in the capacity resource distribution information.

12. The method according to claim 10, wherein, the capacity description information includes at least resource name of this item of the apparatus capacity resource and attribute description of the apparatus providing this item of the apparatus capacity resource.

13. The method according to claim 11, wherein, the obtaining the first weighting score of each atom motion further includes:

obtaining the first weighting score of each atom motion according to storage description information in the storage resource distribution information.

14. The method according to claim 13, wherein, the description parameter of the storage resource includes one or more of operation mode, resource type, file name, distribution time and update time of this item of the storage resource.

15. The method according to claim 10, wherein, the capacity resource is provided by the internal device that the information distributing apparatus has and/or the peripheral device connected to the information distributing apparatus in the first autonomy environment to which the information distributing apparatus belongs, wherein the first operation address includes the first apparatus identification of the information distributing apparatus and device identification of the internal device and/or the peripheral device providing this item of capacity resource in the first autonomy environment;

the storage resource includes local data stored in the information distributing apparatus, data entry information stored in relation database of the information distributing apparatus, data stream generated in the information distributing apparatus, and/or remote end data stored in a second server that can be connected with the information distributing apparatus;

the first storage address includes the first apparatus identification of the information distributing apparatus and storage identification of storage location of the storage resource with respect to the information distributing apparatus;

the first apparatus identification includes a user identification, an identification of the first autonomy environment, and a second apparatus identification in the first autonomy environment to which the information distributing apparatus belongs.

16. The method according to claim 10, further including:

sending the atom motion included in the target execution route to the task initiating apparatus;

receiving an execution route of the atom motion included in the target execution route from the target capacity providing device; and sending the execution route of the atom motion included in the target execution route to the task initiating apparatus.

17. The method according to claim 16, further including:

receiving a first motion cancel instruction from the task initiating apparatus;

determining a first atom motion in the atom motion included in the target execution route according to the first motion cancel instruction;

determining a first capacity providing device for executing the first atom motion in the target capacity providing device; and sending a second motion cancel instruction to the first capacity providing device, wherein the first capacity providing device cancels the execution of the first atom motion according to the second motion cancel instruction.

18. The method according to claim 1, wherein, the capacity resource distribution information includes a first universal resource identifier (URI), and the first URI indicates operation address of the device providing this item of the apparatus capacity resource, the generating the capacity resource distribution information of this item of the apparatus capacity resource according to the first apparatus identification and the local capacity resource parameter of each item of the apparatus capacity resource includes:

generating the first URI according to the first apparatus identification and the device identification in the local capacity resource parameter.

19. The apparatus according to claim 9, wherein, the capacity resource distribution information includes a first universal resource identifier (URI), and the first URI indicates operation address of the device providing this item of the apparatus capacity resource, the information generating unit configured to generating the first URI according to the first apparatus identification and the device identification in the local capacity resource parameter.

20. The method according to claim 10, wherein, the capacity resource distribution information includes a first universal resource identifier (URI), and the first URI indicates operation address of the device providing this item of the apparatus capacity resource, the information generating unit configured to generating the first URI according to the first apparatus identification and the device identification in the local capacity resource parameter.

* * * * *